United States Patent
Kwon et al.

(10) Patent No.: US 11,252,586 B2
(45) Date of Patent: Feb. 15, 2022

(54) SYSTEM AND METHOD FOR PERIODIC BEAM FAILURE MEASUREMENTS

(71) Applicant: Huawei Technologies Co., Ltd., Shenzhen (CN)

(72) Inventors: Young Hoon Kwon, Laguna Niguel, CA (US); Pengfei Xia, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/410,734

(22) Filed: May 13, 2019

(65) Prior Publication Data

US 2019/0268790 A1 Aug. 29, 2019

Related U.S. Application Data

(63) Continuation of application No. PCT/CN2018/101279, filed on Aug. 20, 2018.
(Continued)

(51) Int. Cl.
*H04W 24/08* (2009.01)
*H04B 17/309* (2015.01)
*H04W 88/02* (2009.01)

(52) U.S. Cl.
CPC .......... *H04W 24/08* (2013.01); *H04B 17/309* (2015.01); *H04W 88/02* (2013.01)

(58) Field of Classification Search
CPC ..... H04W 24/08; H04W 88/02; H04W 24/10; H04W 76/19; H04W 24/04; H04W 16/28;
(Continued)

(56) References Cited

U.S. PATENT DOCUMENTS

| 2011/0110453 A1 | 5/2011 | Prasad et al. |
| 2011/0249643 A1* | 10/2011 | Barbieri ................ H04L 1/0028 370/329 |

(Continued)

FOREIGN PATENT DOCUMENTS

| CN | 103875191 A | 6/2014 |
| CN | 106255209 A | 12/2016 |

(Continued)

OTHER PUBLICATIONS

MediaTek Inc. Further Clarification on Beam Failure Recovery Procedure, Jan. 26, 2018, 3GPP TSG-RAN WG2 Meeting AH-1801, R2-1800652 (Year: 2018).*
(Continued)

*Primary Examiner* — Tejis Daya
(74) *Attorney, Agent, or Firm* — Slater Matsil, LLP

(57) ABSTRACT

A method for measuring beams includes determining a measurement period duration in accordance with periods of one or more periodic beam failure detection (BFD) reference signals (RSs) of a BFD RS set, wherein the BFD RSs of the one or more BFD RSs of the BFD RS set have a quasi-co-located (QCL) relationship with demodulation RSs (DMRSs) of PDCCH receptions monitored by a user equipment (UE), monitoring a subset of the one or more BFD RSs having the QCL relationship with the DMRSs of PDCCH receptions monitored by the UE that occur during a measurement period, and determining that measures of all BFD RSs in the subset of the one or more BFD RSs do not meet a specified threshold, and based thereon, reporting a beam failure (BF) instance.

24 Claims, 9 Drawing Sheets

Related U.S. Application Data

(60) Provisional application No. 62/716,580, filed on Aug. 9, 2018, provisional application No. 62/645,911, filed on Mar. 21, 2018, provisional application No. 62/628,799, filed on Feb. 9, 2018.

(58) Field of Classification Search
CPC .. H04B 17/309; H04B 7/0695; H04B 7/0639; H04B 7/0632
See application file for complete search history.

(56) References Cited

U.S. PATENT DOCUMENTS

| | | | |
|---|---|---|---|
| 2013/0039345 | A1 | 2/2013 | Kim et al. |
| 2014/0198680 | A1* | 7/2014 | Siomina .................. H04L 5/14 370/252 |
| 2017/0230849 | A1 | 8/2017 | Wei et al. |
| 2017/0273058 | A1* | 9/2017 | Agiwal ................ H04B 7/0617 |
| 2018/0042000 | A1 | 2/2018 | Zhang et al. |
| 2018/0219604 | A1 | 8/2018 | Lu et al. |
| 2018/0255472 | A1* | 9/2018 | Chendamarai Kannan ................. H04W 76/10 |
| 2018/0359790 | A1* | 12/2018 | Ingale .................... H04W 28/16 |
| 2019/0081753 | A1* | 3/2019 | Jung ..................... H04W 24/10 |
| 2019/0116510 | A1 | 4/2019 | Zhang et al. |
| 2019/0190582 | A1* | 6/2019 | Guo ...................... H04L 5/0048 |
| 2019/0245737 | A1* | 8/2019 | Zhou ................... H04L 41/0668 |
| 2019/0268790 | A1 | 8/2019 | Kwon et al. |
| 2020/0328796 | A1* | 10/2020 | Turtinen ............... H04W 76/19 |
| 2020/0413273 | A1* | 12/2020 | Turtinen ............... H04W 76/19 |

FOREIGN PATENT DOCUMENTS

| | | |
|---|---|---|
| CN | 107079459 A | 8/2017 |
| CN | 107453794 A | 12/2017 |
| CN | 107534467 A | 1/2018 |
| CN | 107612602 A | 1/2018 |
| CN | 110958635 A | 4/2020 |
| WO | 2015133785 A1 | 9/2015 |
| WO | 2017196612 A1 | 11/2017 |
| WO | 2018022677 A1 | 2/2018 |
| WO | WO-2019134092 A1 * 7/2019 ............ H04W 24/10 |

OTHER PUBLICATIONS

Beam recovery procedure, Jan. 26, 2018, 3GPP TSG-RAN WSG2 NR Ad hoc 1801, R2-1800964 (Year: 2018).*

3rd Generation Partnership Project; Technical Specification Group Radio Access Network; NR; Physical layer procedures for data (Release 15), 3GPP TS 38.214 V 15.4.0, Dec. 2018, 102 pages.

"RAN1 Chairman's Notes," 3GPP TSG RAN WG1 Meeting AH 1801, Vancouver, Canada, Jan. 22-26, 2018, 95 pages.

MCC Support, "Draft Report of 3GPP TSG RAN WG1 #92 v0.2.0," 3GPP TSG RAN WG1 Meeting #92bis, Sanya, China, Apr. 16-20, 2018, 185 pages.

Intel Corporation, "Summary of Discussion for NR Radio Link Monitoring", 3GPP TSG RAN WG1 Meeting #90bis, R1-1719048, Oct. 9-13, 2017, 9 Pages, Prague, Czech Republic.

3rd Generation Partnership Project; Technical Specification Group Radio Access Network; NR; Physical layer procedures for control (Release 15), 3GPP TS 38.213, V15.0.0, 56 pages, Dec. 2017.

3rd Generation Partnership Project; Technical Specification Group Radio Access Network; NR; Medium Access Control (MAC) protocol specification (Release 15), 3GPP TS 38.321, V15.0.0, 55 pages, Dec. 2017.

Huawei et al., "Summary of remianing issues on beam failure recovery", 3GPP TSG RAN WG1 Ad Hoc Meeting, R1-1800101, Jan. 22-26, 2018, 9 Pgaes, Vancouver, Canada.

Mediatek Inc., "Offline Summary for Remaning issues on Beam Failure Recovery", 3GPP TSG RAN WG1 Meeting #AH1801, R1-1801197, Jan 22th-Jan. 26, 2018, 10 Pages, Vancouver, CA.

Catt, "Summary on BFR detection and other BFR issues", 3GPP TSG-RAN WG2 NR Ad hoc 0118, R2-1801558, Jan. 22-26, 2018, 11 Pages, Vancouver, Canada.

* cited by examiner

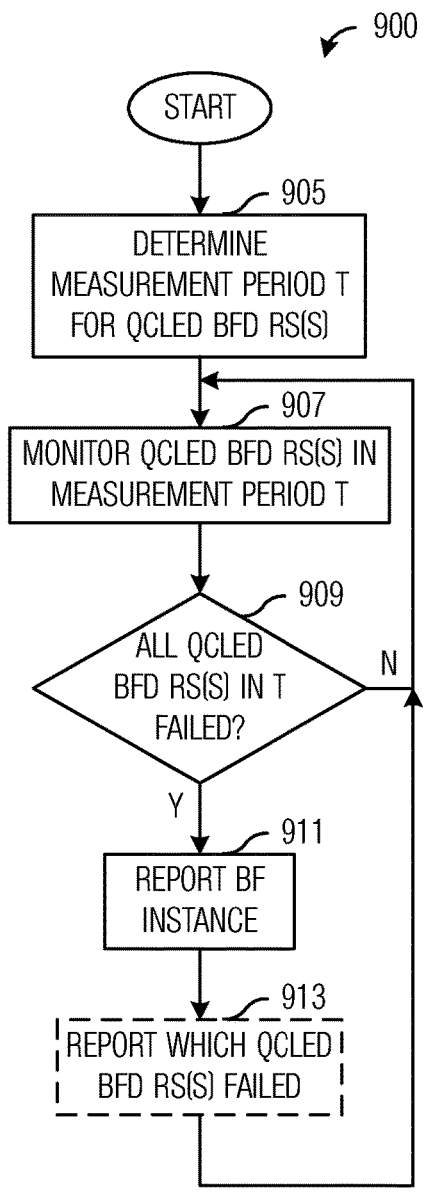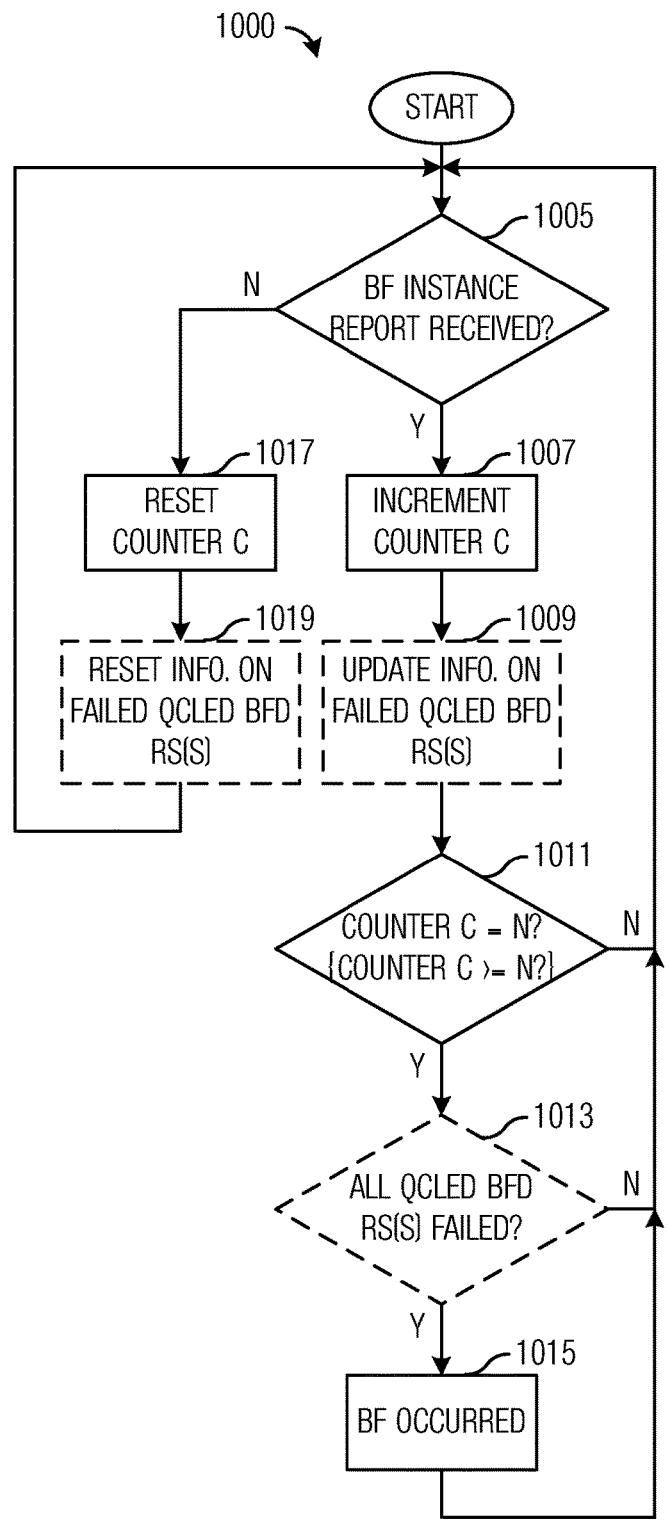
Fig. 9
Fig. 10

SYSTEM AND METHOD FOR PERIODIC BEAM FAILURE MEASUREMENTS

PRIORITY CLAIM AND CROSS-REFERENCE

This application is a continuation of PCT Application No. PCT/CN2018/101279, filed Aug. 20, 2018, entitled "System and Method for Periodic Beam Failure Measurements", which claims the benefit of U.S. Provisional Applications No. 62/716,580, filed on Aug. 9, 2018, entitled "System and Method for Periodic Beam Failure Measurements," Application No. 62/645,911, filed on Mar. 21, 2018, entitled "System and Method for Periodic Beam Failure Measurements," and Application No. 62/628,799, filed on Feb. 9, 2018, entitled "Apparatus and Methods for Reporting Beam Failure," which applications are hereby incorporated herein by reference in their entireties.

TECHNICAL FIELD

The present disclosure relates generally to a system and method for digital communications, and, in particular embodiments, to a system and method for periodic beam failure measurements.

BACKGROUND

One possible deployment scenario for fifth generation (5G) New Radio (NR) system architecture uses high frequency (HF) (6 gigahertz (GHz) and above, such as millimeter wavelength (mmWave) operating frequencies to exploit greater available bandwidth and less interference then what is available at the congested lower frequencies. However, pathloss is a significant issue. Beamforming may be used to overcome the high pathloss.

However, the beams are prone to blockage. Therefore, a beam that is being used for communications may become blocked and fail, leaving the communications device without a connection. Therefore, there is a need for systems and methods for periodic beam failure measurements to detect beam failures.

SUMMARY

Example embodiments provide a system and method for periodic beam failure measurements.

In accordance with an example embodiment, a computer implemented method for measuring beams is provided. The method includes determining, by a user equipment (UE), a measurement period duration of measurement periods in a plurality of measurement periods, wherein the measurement period duration is determined in accordance with periods of one or more periodic beam failure detection (BFD) reference signals (RSs) of a BFD RS set, wherein the BFD RSs of the one or more BFD RSs of the BFD RS set have a quasi-co-located (QCL) relationship with demodulation RSs (DMRSs) of PDCCH receptions monitored by the UE, monitoring, by the UE, a subset of the one or more BFD RSs having the QCL relationship with the DMRSs of PDCCH receptions monitored by the UE that occur during a measurement period, and determining, by the UE, that measures of all BFD RSs in the subset of the one or more BFD RSs do not meet a specified threshold, and based thereon, reporting, by the UE, a beam failure (BF) instance.

Optionally, in any of the preceding embodiments, an embodiment wherein the UE monitors all of the one or more BFD RSs having the QCL relationship with the DMRSs of PDCCH receptions monitored by the UE that occur during the measurement period.

Optionally, in any of the preceding embodiments, an embodiment further includes reporting, by the UE, information about the BFD RSs in the subset of the one or more BFD RSs when the measures of all BFD RSs in the subset of the one or more BFD RSs do not meet the specified threshold.

Optionally, in any of the preceding embodiments, an embodiment wherein the measures are signal quality measurements, and wherein determining that the measures of all BFD RSs in the subset of the one or more BFD RSs do not meet the specified threshold comprises determining that the measures of all BFD RSs in the subset of the one or more BFD RSs do not exceed the specified threshold.

Optionally, in any of the preceding embodiments, an embodiment wherein the measures are block error rates (BLERs), and wherein determining that the measures of all BFD RSs in the subset of the one or more BFD RSs do not meet the specified threshold comprises determining that the measures of all BFD RSs in the subset of the one or more BFD RSs exceed the specified threshold.

Optionally, in any of the preceding embodiments, an embodiment wherein the measurement period duration is determined in accordance with a shortest period of any BFD RS in the one or more BFD RSs.

Optionally, in any of the preceding embodiments, an embodiment wherein the measurement period duration is determined in accordance with a maximum of a shortest period of any BFD RS in the one or more BFD RSs and a specified value.

Optionally, in any of the preceding embodiments, an embodiment wherein the measurement period duration is determined in accordance with a maximum between the shortest periodicity of any BFD RS in the one or more BFD RSs and a specified value.

Optionally, in any of the preceding embodiments, an embodiment wherein a BFD RS comprises a channel station information reference signal (CSI-RS) configuration, a synchronization signal (SS) block, or a physical broadcast channel (PBCH) block.

Optionally, in any of the preceding embodiments, an embodiment wherein determining the measurement period duration, monitoring the subset of the BFD RSs, and determining that measures of all BFD RSs are performed by a physical (PHY) layer entity of the UE, and wherein the BF instance is reported to a higher layer entity of the UE.

Optionally, in any of the preceding embodiments, an embodiment wherein the higher layer entity is a media access control (MAC) layer entity.

Optionally, in any of the preceding embodiments, an embodiment further includes determining, by the UE, that a BF has occurred in accordance with one or more reported BF instances, identifying, by the UE, a candidate beam, and sending, by the UE, a beam failure recovery request (BFRQ) in accordance with the candidate beam.

Optionally, in any of the preceding embodiments, an embodiment wherein a BF is declared when a plurality of BF instances occur over a specified number of consecutive measurement periods.

In accordance with an example embodiment, a computer implemented method for measuring beams is provided. The method includes determining, by a UE, a measurement period duration of measurement periods in a plurality of measurement periods, wherein the measurement period duration is determined in accordance with periods of one or more periodic BFD RSs of a BFD RS set, wherein the one or more BFD RSs of the BFD RS set are quasi co-located with DMRS of control channel receptions monitored by the UE, and wherein the one or more BFD RSs of the BFD RS set are used by the UE to assess a radio link quality, and in each of a plurality of measurement periods, determining, by the UE, that the radio link quality is worse than a specified threshold, and based thereon, reporting, by the UE, a BF instance.

Optionally, in any of the preceding embodiments, an embodiment wherein determining that the radio link quality is worse than the specified threshold comprises determining that measures of all BFD RSs in a subset of the one or more BFD RSs of the BFD RS set that occur during the measurement period do not meet the specified threshold.

Optionally, in any of the preceding embodiments, an embodiment wherein the control channel receptions are physical downlink control channel (PDCCH) receptions.

Optionally, in any of the preceding embodiments, an embodiment wherein the measurement period duration is determined in accordance with a shortest period of any BFD RS in the one or more BFD RSs.

Optionally, in any of the preceding embodiments, an embodiment wherein the measurement period duration is determined in accordance with a maximum of a shortest period of any BFD RS in the one or more BFD RSs and a specified value.

Optionally, in any of the preceding embodiments, an embodiment wherein the measurement period duration is determined in accordance with a maximum between the shortest periodicity of any BFD RS in the one or more BFD RSs and a specified value.

Optionally, in any of the preceding embodiments, an embodiment wherein determining the measurement period duration, and determining that the radio link quality is worse are performed by a PHY layer entity of the UE, and wherein the BF instance is reported to a higher layer entity of the UE.

Optionally, in any of the preceding embodiments, an embodiment further includes determining, by the UE, that a BF has occurred in accordance with one or more reported BF instances, identifying, by the UE, a candidate beam, and sending, by the UE, a BFRQ in accordance with the candidate beam.

Optionally, in any of the preceding embodiments, an embodiment wherein a BF is declared when a plurality of BF instances occur over a specified number of consecutive measurement periods.

In accordance with an example embodiment, a UE is provided. The UE includes a memory storage comprising instructions, and one or more processors in communication with the memory storage. The one or more processors execute the instructions to determine a measurement period duration of measurement periods in a plurality of measurement periods, wherein the measurement period duration is determined in accordance with periods of one or more periodic BFD RSs of a BFD RS set, wherein the BFD RSs of the one or more BFD RSs of the BFD RS set have a QCL relationship with DMRSs of PDCCH receptions monitored by the UE, monitor a subset of the one or more BFD RSs having the QCL relationship with the DMRSs of PDCCH receptions monitored by the UE that occur during a measurement period, and determine that measures of all BFD RSs in the subset of the one or more BFD RSs do not meet a specified threshold, and based thereon, report a BF instance.

Optionally, in any of the preceding embodiments, an embodiment wherein the one or more processors further execute the instructions to report information about the BFD RSs in the subset of the one or more BFD RSs when the measures of all BFD RSs in the subset of the one or more BFD RSs do not meet the specified threshold.

Optionally, in any of the preceding embodiments, an embodiment wherein the measures are signal quality measurements, and wherein the one or more processors further execute the instructions to determine that the measures of all BFD RSs in the subset of the one or more BFD RSs do not exceed the specified threshold.

Optionally, in any of the preceding embodiments, an embodiment wherein the measures are BLERs, and wherein the one or more processors further execute the instructions to determine that the measures of all BFD RSs in the subset of the one or more BFD RSs exceed the specified threshold.

Optionally, in any of the preceding embodiments, an embodiment wherein the one or more processors further execute the instructions to determine that a BF has occurred in accordance with one or more reported BF instances, identify a candidate beam, and send a BFRQ in accordance with the candidate beam.

Optionally, in any of the preceding embodiments, an embodiment wherein the measurement period duration is determined in accordance with a shortest period of any BFD RS in the one or more BFD RSs.

Optionally, in any of the preceding embodiments, an embodiment wherein the measurement period duration is determined in accordance with a maximum of a shortest period of any BFD RS in the one or more BFD RSs and a specified value.

Optionally, in any of the preceding embodiments, an embodiment wherein the measurement period duration is determined in accordance with a maximum between the shortest periodicity of any BFD RS in the one or more BFD RSs and a specified value.

In accordance with an example embodiment, a UE is provided. The UE includes a memory storage comprising instructions, and one or more processors in communication with the memory storage. The one or more processors execute the instructions to determine a measurement period duration of measurement periods in a plurality of measurement periods, wherein the measurement period duration is determined in accordance with periods of one or more periodic BFD RSs of a BFD RS set, wherein the one or more BFD RSs of the BFD RS set are quasi co-located with DMRS of control channel receptions monitored by the UE, and wherein the one or more BFD RSs of the BFD RS set are used by the UE to assess a radio link quality, and in each of a plurality of measurement periods, determine that the radio link quality is worse than a specified threshold, and based thereon, report a BF instance.

Optionally, in any of the preceding embodiments, an embodiment wherein the one or more processors further execute the instructions to determine that measures of all BFD RSs in a subset of the one or more BFD RSs of the BFD RS set that occur during the measurement period do not meet the specified threshold.

Optionally, in any of the preceding embodiments, an embodiment wherein the control channel receptions are PDCCH receptions.

Practice of the foregoing embodiments enables a communications device to determine a periodicity of beam failure measurements based only on beam failure detection reference signals that are assessed for link quality. Setting the periodicity of the beam failure measurements based only on the beam failure detection reference signals that are assessed for link quality (rather than all beam failure reference signals of a measurement set) ensures that the communications device is able to measure at least one beam failure detection reference signal that it has to assess in each measurement period.

Practice of the foregoing embodiments ensures that there is at least one beam failure detection reference signals that the communications device has to assess in each measurement period. Hence, the tracking of beam failure instances is not skewed by measurement periods that lack beam failure detection reference signals that are not assessed by the communications device.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 9 illustrates a flow diagram of example operations occurring in a UE making BF measurements and responding accordingly according to example embodiments described herein;

FIG. 10 illustrates a flow diagram of example operations occurring in a UE processing BF instances and responding accordingly according to example embodiments described herein;

DETAILED DESCRIPTION OF ILLUSTRATIVE EMBODIMENTS

The making and using of the disclosed embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
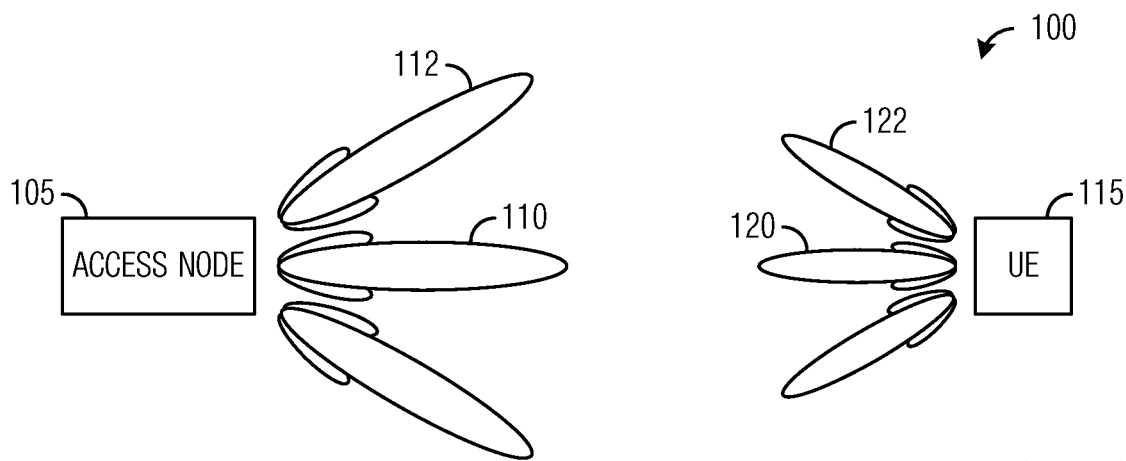
FIG. 1 illustrates an example wireless communications system.

FIG. 1 illustrates an example wireless communications system 100. Communications system 100 includes an access node 105 serving a user equipment (UE) 115. In a first operating mode, communications to and from UE 115 pass through access node 105. In a second operating mode, communications to and from UE 115 do not pass through access node 105, however, access node 105 typically allocates resources used by UE 115 to communicate. Access nodes may also be commonly referred to as Node Bs, evolved Node Bs (eNBs), next generation (NG) Node Bs (gNBs), master eNBs (MeNBs), secondary eNBs (SeNBs), master gNBs (MgNBs), secondary gNBs (SgNBs), network controllers, control nodes, base stations, access points, transmission points (TPs), transmission-reception points (TRPs), cells, carriers, macro cells, femtocells, pico cells, and so on, while UEs may also be commonly referred to as mobile stations, mobiles, terminals, users, subscribers, stations, and the like. Access nodes may provide wireless access in accordance with one or more wireless communication protocols, e.g., the Third Generation Partnership Project (3GPP) long term evolution (LTE), LTE advanced (LTE-A), 5G, 5G LTE, 5G NR, High Speed Packet Access (HSPA), Wi-Fi 802.11a/b/g/n/ac, etc. While it is understood that communications systems may employ multiple eNBs capable of communicating with a number of UEs, only one eNB, and a number of UEs are illustrated for simplicity.

While it is understood that communications systems may employ multiple access nodes capable of communicating with a number of UEs, only one access node and one UE are illustrated for simplicity.

As discussed previously, pathloss in communications systems operating at high frequency (HF) (6 gigahertz (GHz) and above, such as millimeter wavelength (mm-Wave)) operating frequencies is high, and beamforming may be used to overcome the high pathloss. As shown in FIG. 1, both access node 105 and UE 115 communicate using beamformed transmissions and receptions. As an example access node 105 communicates using a plurality of communications beams, including beams 110 and 112, while UE 115 communicates using a plurality of communications beams, including beams 120 and 122.

A beam may be a pre-defined set of beamforming weights in the context of codebook-based precoding or a dynamically defined set of beamforming weights in the context of non-codebook based precoding (e.g., Eigen-based beamforming (EBB)). A beam may also be a pre-defined set of phase shift preprocessors combining signals from the antenna array in the radio frequency (RF) domain. It should be appreciated that a UE may rely on codebook-based precoding to transmit uplink signals and receive downlink signals, while a TRP may rely on non-codebook based precoding to form certain radiation patterns to transmit downlink signals and/or receive uplink signals.

Figure 2:
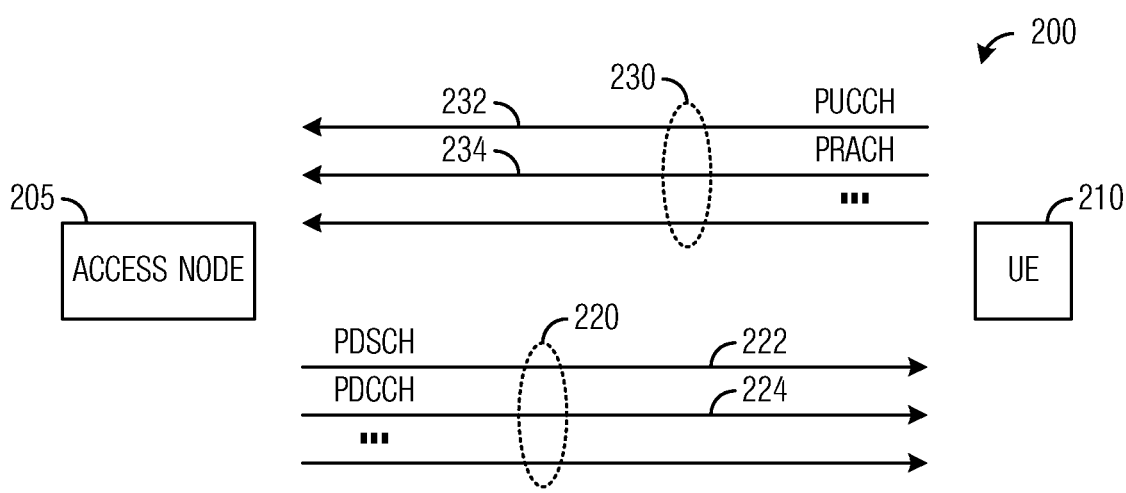
FIG. 2 illustrates a communications system highlighting an example channel structure between an access node and a UE.

FIG. 2 illustrates a communications system 200 highlighting an example channel structure between an access node 205 and a UE 210. In a bi-directional communications implementation, there is a downlink channel 220 and an uplink channel 230 between access node 205 and UE 210. Downlink channel 220 and uplink channel 230 may each include a plurality of unidirectional channels. As shown in FIG. 2, downlink channel 220 includes a physical downlink shared channel (PDSCH) 222 and a physical downlink control channel (PDCCH) 224 among others, while uplink channel 230 includes a physical uplink control channel (PUCCH) 232 and a physical random access channel (PRACH) 234 among others. Other channels may be present in downlink channel 220 or uplink channel 230 but are not shown in FIG. 2.

Figure 3:
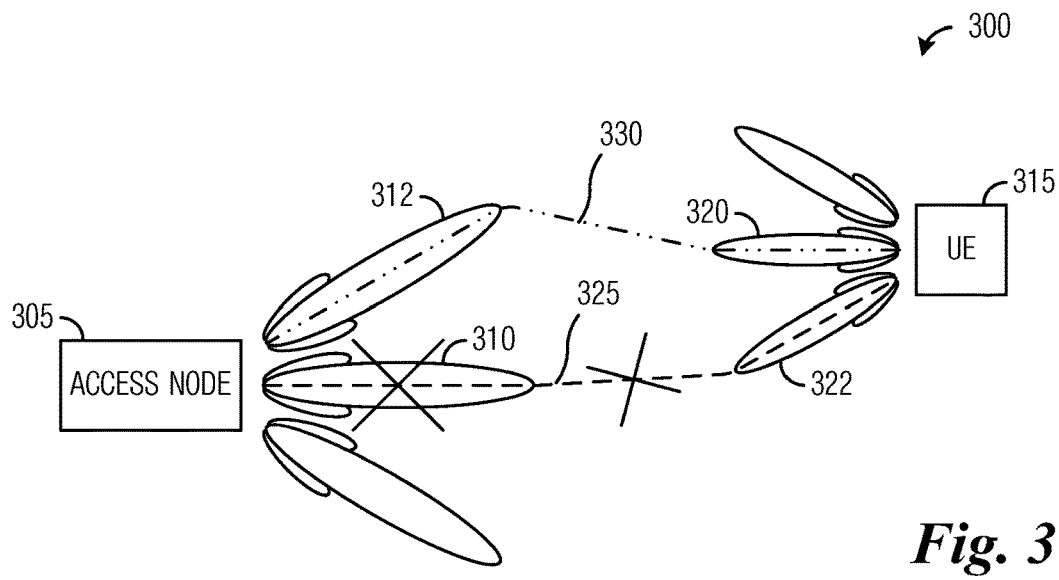
FIG. 3 illustrates a wireless communications system highlighting beam failure and beam failure recovery.

FIG. 3 illustrates a wireless communications system 300 highlighting beam failure and beam failure recovery. Communications system 300 includes an access node 305 serving a UE 315. As shown in FIG. 3, both access node 305 and UE 315 communicate using beamformed transmissions and receptions. As an example access node 305 communicates using a plurality of communications beams, including beams 310 and 312, while UE 315 communicates using a plurality of communications beams, including beams 320 and 322.

Initially, access node 305 and UE 315 are communicating through beam pair link (BPL) 325, which comprises beams 310 and 322. However, due to blockage or UE mobility, BPL 325 fails. UE 315 detects a candidate beam 312 from access node 305 to replace failed beam 310, for example. UE 315 initiates beam failure recovery by sending a beam failure recovery request (BFRQ) to access node 305. Upon completion of the beam failure recovery, BPL 330 is established (comprising beams 312 and 320).

When two or more reference signals, data signals and/or resources are related in such a way that the two or more reference signals, data signals and/or resources may be viewed as possessing similar characteristics, they are said to possess a quasi co-located (QCL) relationship. QCL relationships may refer to time, frequency, code, and/or spatial relationships between two or more reference signals, data signals, and/or resources, while spatial QCL refers to only spatial relationships between two or more reference signals, data signals, and/or resources. The spatial QCL information may include associations between signals and resources, such as CSI-RS resources and wideband reference signals (WBRS), or associations between individual WBRSs, or associations between CSI-RS resources and beamformed random access channels (BRACHs). As an example, in a one to one association, each CSI-RS signal is associated with one WBRS such that the transmit precoder for the CSI-RS signal is the same as a transmit precoder for the WBRS. As another example, each CSI-RS signal is associated with one WBRS such that the transmit precoder for the CSI-RS signal is the same as a transmit precoder for the WBRS. As another example, a first WBRS is associated with a second WBRS such that the transmit precoder for the second WBRS is the same as that for the first WBRS. It is possible that multiple CSI-RS signals are associated with a single WBRS, and vice versa. The spatial QCL information may be stored in tabular form or in a memory of a device. The spatial QCL information includes associations between CSI-RS and WBRSs. The spatial QCL information may be used by the UE to determine CSI-RS beam indices from WBRS beam indices, and vice versa, for example. As an example, in a one-to-one association, each CSI-RS signal is associated with one WBRS. It is possible that multiple CSI-RS signals are associated with a single WBRS, and vice versa.

At the 3GPP RAN1 Ad Hoc 1801 meeting, dedicated physical random access channel (PRACH) transmission based beam failure recovery mechanisms were discussed and the following agreements were made:

For beam failure detection (BFD) model, an entity or function at a physical (PHY) layer of a communications device performs the detection of beam failure (BF) instances. The PHY layer entity conveys a flag to a higher layer entity if a BF instance is detected. Areas for further study include: when or whether the PHY layer entity needs to report a candidate beam list and a BF instance to a media access control (MAC) layer entity, and whether a non-BF instance is defined or needed.

Change(s) to the candidate beam selection model include:
The PHY layer entity performs Layer 1 reference signal received power (RSRP) evaluation of each candidate new beam and provides to a higher layer entity, information (a beam reference signal (RS) index and Layer 1 RSRP) for a subset of candidate new beams that satisfy the Layer 1 RSRP threshold. It is expected that the higher layer entity performs new candidate beam selection based on the information.
It is noted that the mapping between RS index (indices) to RACH resource(s) or sequence(s) is performed in the MAC layer entity.
Support for the candidate beam selection model is specified in the 3GPP RAN2 specifications.

Behavior of a Beam-failure-recovery-Timer includes: Start the Beam-failure-recovery-Timer upon a BF detection event declared by the UE, and stop the Beam-failure-recovery-Timer upon reception of a response from an access node for BF recovery request transmission.

From the perspective of 3GPP RAN1, contention-free PRACH-based BF recovery is considered unsuccessful when one of the following is met: Upon expiry of the Beam-failure-recovery-Timer, or upon reaching a maximum number of BFRQ transmissions.

Transmission of information conveying or indicating a BF instance to a higher layer entity is periodic, and the transmission interval is determined by the shortest periodicity of a BFD RS of a BFD RS set q_0. The transmission interval is also bounded by a currently undetermined time value. It is noted that if the evaluation is below a BF instance block error rate (BLER) threshold, there is no information sent to the higher layer entity.

The PHY layer entity provides to a higher layer entity one or more sets of {beam RS index and Layer 1 RSRP} that satisfy the Layer 1 RSRP threshold upon a request from the higher layer entity.

Legacy BFD operations may be as follows:

At every measurement period T (also referred to above as the transmission of information interval), A PHY layer entity measures the signal quality of BFD RSs that are members of BFD RS set q_0 occurring during measurement period T.

If the signal quality of all BFD RSs within measurement period T is below a threshold, the PHY layer entity reports a BF instance to a higher layer entity, such as a MAC layer entity. It is noted that if BLER is used as a signal quality threshold, then the BLER would be above the threshold for the PHY layer entity to report a BF instance.

If there are any BFD RSs within measurement period T with signal quality above the threshold, the PHY layer entity does not report a BF instance to the higher layer entity.

If the higher layer entity receives N consecutive BF instances from the PHY layer entity, the higher layer entity declares a BF.

It is noted that the measurement period T for the PHY layer entity to measure signal quality is the larger of a shortest period of the BFD RSs in BFD RS set q_0 and a currently undetermined time value (which may be specified as a parameter). Because T is equal to or greater than the period of any BFD RS in the BFD RS set q_0, there is at least one BFD RS in BFD RS set q_0 within the measurement period T. Hence, in each measurement period T, the PHY layer entity can make a determination if a BF instance has occurred or not. However, not all BFD RSs in BFD RS set q_0 is assessed for the signal quality. For the BFD RS set q_0, the UE accesses the signal quality only according to periodic channel state information RS (CSI-RS) resource configurations, or synchronization signal (SS) or physical broadcast channel (PBCH) blocks that have a QCL relationship with a demodulation RS (DMRS) of physical downlink control channels (PDCCH) receptions monitored by the UE. Therefore, if the BFD RS with the shortest period in BFD RS set q_0 does not have a QCL relationship with the DMRSs of PDCCH receptions monitored by the UE, there is a non-zero probability that there will be one or more measurement periods where the UE will not be assessing any BFD RSs. Although the discussion focuses on determining the duration of the measurement period based on BFD RSs that have a QCL relationship with DMRS of PDCCH receptions monitored by the UE, the example embodiments presented herein are operable with BFD RSs that have a QCL relationship with any DMRS of control channels or data channels monitored by the UE.

If the UE is not assessing any BFD RSs within a particular measurement period, then there will be no BFD RS with signal quality that is below the threshold. Therefore, there will be no BF instance for the PHY layer entity to report to the higher layer entity. If the higher layer entity does not receive a BF instance report from the PHY layer entity for a measurement period, the higher layer entity will reset its counter used for counting consecutive measurement periods with BF instance. Hence, BFs of BFD RSs will potentially be missed.

Figure 4:
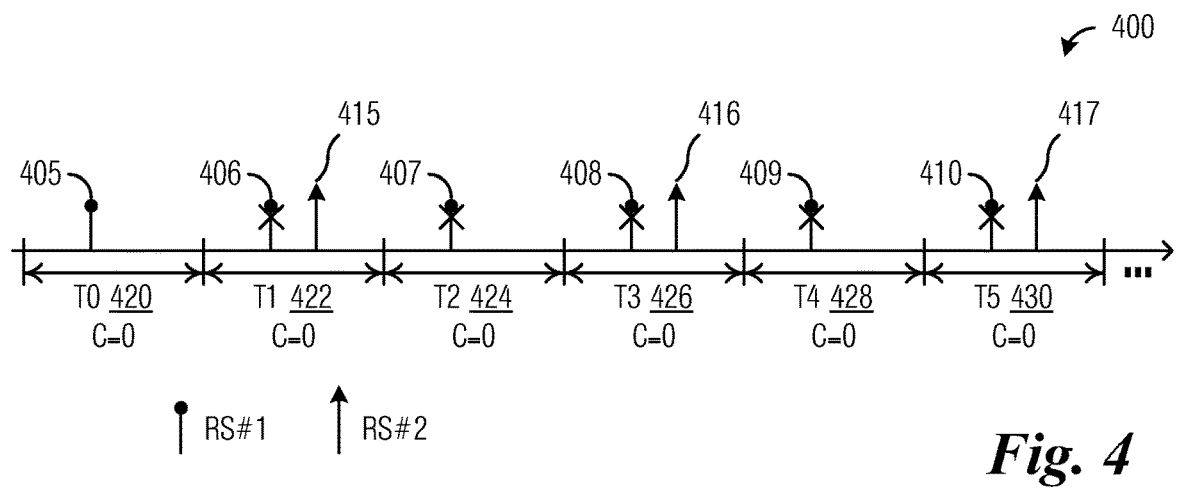
FIG. 4 illustrates a diagram of a first example sequence of BFD RSs highlighting measurement periods where a UE is not assessing BFD RSs.

FIG. 4 illustrates a diagram 400 of a first example sequence of BFD RSs highlighting measurement periods where a UE is not assessing BFD RSs. As shown in FIG. 4, BFD RS set q_0 comprises two BFD RSs, RS#1 shown as a vertical line with a circular end (includes RS#1s 405-410) and RS#2 shown as a vertical line with an arrow end (includes RS#2s 415-417), where RS#1s does not have a QCL relationship with the DMRSs of PDCCH receptions monitored by the UE and RS#2s does have a QCL relationship with the DMRSs of PDCCH receptions monitored by the UE. In other words, the UE will be assessing RS#2s and not RS#1s. Furthermore, the period of RS#2s is twice as long as the period of RS#1s, and the measurement periods are determined by the period of RS#1s. Additionally, a number of consecutive BF instances leading to beam failure is two (N=2) and is maintained by a counter C. A total of six measurement periods are shown in FIG. 4, T0 420, T1 422, T2 424, T3 426, T4 428, and T5 430.

An RS#1 is found in each measurement period because the duration of the measurement periods is determined based on the period of RS#1s. However, RS#2s are found only in every other measurement period. As an example, RS#2 415 is in T1 422, RS#2 416 is in T3 426, and RS#2 417 is in T5 430. Initially, the RS#1s are good but after T0 420, the RS#1s begin to fail (faulty RSs are shown marked with an X).

In T0 420, RS#1 405 is present and not faulty. However, the UE is not assessing the RS#1s so no BF instance is reported independent of if RS#1 405 is faulty or not, hence C=0. In T1 422, RS#1 406 is faulty and RS#2 415 is not faulty. The UE assesses RS#2 415 and determines that the signal quality of RS#2 415 meets the threshold so no BF instance is reported even when RS#1 406 is faulty, hence C=0. In T2 424, only RS#1 407 is present so no BF instance is reported, hence C=0. In T3 426, RS#1 408 is faulty and RS#2 416 is not faulty. The UE assesses RS#2 416 and determines that the signal quality of RS#2 416 meets the threshold so no BF instance is reported even RS#1 408 is faulty, hence C=0. In T4 428, only RS#1 409 is present so no BF instance is reported, hence C=0. In T5 430, RS#1 410 is faulty and RS#2 417 is not faulty. The UE assesses RS#2 417 and determines that the signal quality of RS#2 417 meets the threshold so no BF instance is reported even RS#1 410 is faulty, hence C=0.

Figure 5:
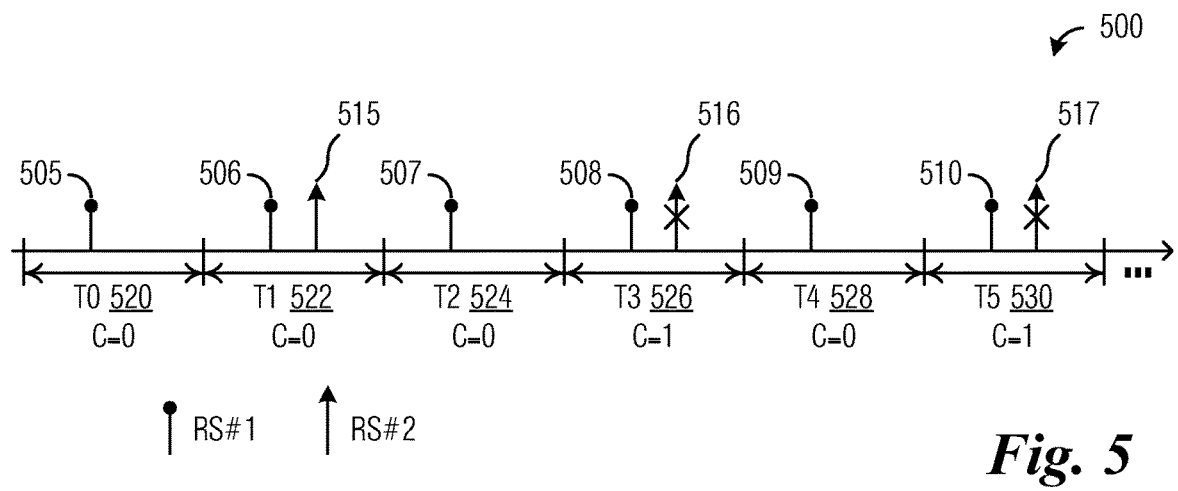
FIG. 5 illustrates a diagram of a second example sequence of BFD RSs highlighting measurement periods where a UE is not assessing BFD RSs.

FIG. 5 illustrates a diagram 500 of a second example sequence of BFD RSs highlighting measurement periods where a UE is not assessing BFD RSs. As shown in FIG. 5, BFD RS set q_0 comprises two BFD RSs, RS#1 shown as a vertical line with a circular end (includes RS#1s 505-510) and RS#2 shown as a vertical line with an arrow end (includes RS#2s 515-517), where RS#1s does not have a QCL relationship with the DMRSs of PDCCH receptions monitored by the UE and RS#2s does have a QCL relationship with the DMRSs of PDCCH receptions monitored by the UE. In other words, the UE will be assessing RS#2s and not RS#1s. Furthermore, the period of RS#2s is twice as long as the period of RS#1s, and the measurement periods are determined by the period of RS#1s. Additionally, a number of consecutive BF instances leading to beam failure is two (N=2) and is maintained by a counter C. A total of six measurement periods are shown in FIG. 5, T0 520, T1 522, T2 524, T3 526, T4 528, and T5 530.

An RS#1 is found in each measurement period because the duration of the measurement periods is determined based on the period of RS#1s. However, RS#2s are found only in every other measurement period. As an example, RS#2 515 is in T1 522, RS#2 516 is in T3 526, and RS#2 517 is in T5 530. Initially, the RS#2s are good but after T1 522, the RS#2s begin to fail (faulty RSs are shown marked with an X).

In T0 520, RS#1 505 is present and not faulty. However, the UE is not assessing the RS#1s so no BF instance is reported independent of if RS#1 505 is faulty or not, hence C=0. In T1 522, RS#1 506 is not faulty and RS#2 515 is not faulty. The UE assesses RS#2 515 and determines that the signal quality of RS#2 515 meets the threshold so no BF instance is reported, hence C=0. In T2 524, only RS#1 507 is present so no BF instance is reported, hence C=0. In T3 526, RS#1 508 is not faulty and RS#2 516 is faulty. The UE assesses RS#2 516 and determines that the signal quality of RS#2 516 does not meet the threshold so a BF instance is reported, hence C=1. In T4 528, only RS#1 509 is present so no BF instance is reported, hence C is reset (C=0). In T5 530, RS#1 510 is not faulty and RS#2 517 is faulty. The UE assesses RS#2 517 and determines that the signal quality of RS#2 517 does not meet the threshold so a BF instance is reported, hence C=1.

It is noted that measurement periods that do not include any BFD RS should be avoided because the lack of a BF instance arising from such measurement periods will result in the resetting of the consecutive BF instance counter and lead to an erroneous situation where an occurring BF is not detected.

According to an example embodiment, in order to ensure that at least one BFD RS being assessed by the UE is present (or is expected to be present) in each measurement period, the measurement period is determined in accordance with the period(s) of the BFD RS(s) of the BFD RS set q_0 that have a QCL relationship with DMRSs of PDCCH receptions monitored by the UE. According to an example embodiment, in order to ensure that at least one BFD RS being assessed by the UE is present (or is expected to be present) in each measurement period, the measurement period is determined in accordance with the period(s) of the BFD RS(s) of the BFD RS set q_0 that have a QCL relationship with DMRSs of PDCCH receptions monitored by the UE, and one or more predetermined values. The determination of the measurement periods in accordance with the periods of the BFD RSs that are actually being assessed helps to ensure that at least one assessed BFD RS is present (or is expected to be present) in each measurement period. The predetermined values may be specified by a technical standard or by an operator of the communications system.

According to an example embodiment, in order to ensure that at least one BFD RS being assessed by the UE is present (or is expected to be present) in each measurement period, the measurement period is determined in accordance with the period(s) of the BFD RS(s) of the BFD RS set q_0 excluding the BFD RS(s) that do not have a QCL relationship with DMRSs of PDCCH receptions monitored by the UE, and one or more predetermined values. In other words, the BFD RS(s) of the BFD RS set q_0 that do not have a QCL relationship with DMRSs of PDCCH receptions monitored by the UE are excluded from the BFD RS set q_0 and the measurement period is determined in accordance with the period(s) of the remaining BFD RS(s) remaining in the BFD RS set q_0. According to an example embodiment, in order to ensure that at least one BFD RS being assessed by the UE is present (or is expected to be present) in each measurement period, the measurement period is determined in accordance with the period(s) of the BFD RS(s) of the BFD RS set q_0 excluding the BFD RS(s) that do not have a QCL relationship with DMRSs of PDCCH receptions monitored by the UE, and one or more predetermined values. In other words, the BFD RS(s) of the BFD RS set q_0 that do not have a QCL relationship with DMRSs of PDCCH receptions monitored by the UE are excluded from the BFD RS set q_0 and the measurement period is determined in accordance with the period(s) of the remaining BFD RS(s) remaining in the BFD RS set q_0, and one or more predetermined values.

According to an example embodiment, a layer entity, such as a PHY layer entity, informs a higher layer entity when a radio link quality does not meet a threshold with a periodicity that is in accordance with a maximum of a shortest period of periodic BFD RSs of a BFD RS set q_0 having a QCL relationship with DMRSs of PDCCH receptions monitored by the UE, or a specified time value. Determining the radio link quality, for a particular measurement period, may involve assessing the signal quality of one or more BFD RSs of the BFD RS set q_0, present in the measurement period, that have a QCL relationship with DMRSs of PDCCH receptions monitored by the UE, and comparing the one or more signal qualities with a threshold. If all of the one or more signal qualities do not meet the threshold, the layer entity reports a BF instance to the higher layer entity. If less than all of the one or more signal qualities do not meet the threshold, the layer entity does not report a BF instance to the higher layer entity. An example of the threshold is $Q_{\{out, LR\}}$.

According to an example embodiment, a layer entity, such as a PHY layer entity, informs a higher layer entity when a radio link quality does not meet a threshold with a periodicity that is in accordance with a shortest period of periodic BFD RSs of a BFD RS set q_0 having a QCL relationship with DMRSs of PDCCH receptions monitored by the UE.

Determining the radio link quality, for a particular measurement period, may involve assessing the signal quality of one or more BFD RSs of the BFD RS set q_0, present in the measurement period, that have a QCL relationship with DMRSs of PDCCH receptions monitored by the UE, and comparing the one or more signal qualities with a threshold. If all of the one or more signal qualities do not meet the threshold, the layer entity reports a BF instance to the higher layer entity. If less than all of the one or more signal qualities do not meet the threshold, the layer entity does not report a BF instance to the higher layer entity. An example of the threshold is $Q_{\{out, LR\}}$.

According to an example embodiment, a layer entity, such as a PHY layer entity, informs a higher layer entity when a radio link quality does not meet a threshold with a periodicity that is in accordance with a maximum of a shortest period of periodic BFD RSs (from a BFD RS set q_0) used by the UE to assess the radio link quality, and a specified time value. Determining the radio link quality, for a particular measurement period, may involve assessing the signal quality of one or more BFD RSs of the BFD RS set q_0, present in the measurement period, the UE assess the radio link quality, and comparing the one or more signal qualities with a threshold. If all of the one or more signal qualities do not meet the threshold, the layer entity reports a BF instance to the higher layer entity. If less than all of the one or more signal qualities do not meet the threshold, the layer entity does not report a BF instance to the higher layer entity. An example of the threshold is $Q_{\{out, LR\}}$.

For the set q_0, the UE assesses the radio link quality only according to periodic CSI-RS resource configurations, or SS or PBCH blocks that are quasi co-located, as described in 3GPP TS 38.214, with the DMRS of PDCCH receptions monitored by the UE. The PHY layer entity in the UE provides an information to higher layer entities when the radio link quality for all corresponding resource configurations in the set q_0 that the UE uses to assess the radio link quality is worse than a threshold, such as threshold $Q_{out,LR}$. The PHY layer entity informs the higher layer entities when the radio link quality is worse than the threshold $Q_{out,LR}$ with a periodicity determined by the maximum between the shortest periodicity of periodic CSI-RS configurations, or SS or PBCH blocks in the set q_0 that the UE uses to assess the radio link quality and 2 msec.

According to an example embodiment, a layer entity, such as a PHY layer entity, informs a higher layer entity when a radio link quality does not meet a threshold with a periodicity that is in accordance with a shortest period of periodic BFD RSs (from a BFD RS set q_0) used by the UE to assess the radio link quality. Determining the radio link quality, for a particular measurement period, may involve assessing the signal quality of one or more BFD RSs of the BFD RS set q_0, present in the measurement period, that have a QCL relationship with DMRSs of PDCCH receptions monitored by the UE, and comparing the one or more signal qualities with a threshold. If all of the one or more signal qualities do not meet the threshold, the layer entity reports a BF instance to the higher layer entity. If less than all of the one or more signal qualities do not meet the threshold, the layer entity does not report a BF instance to the higher layer entity. An example of the threshold is Q_{out, LR}.

Figure 6:
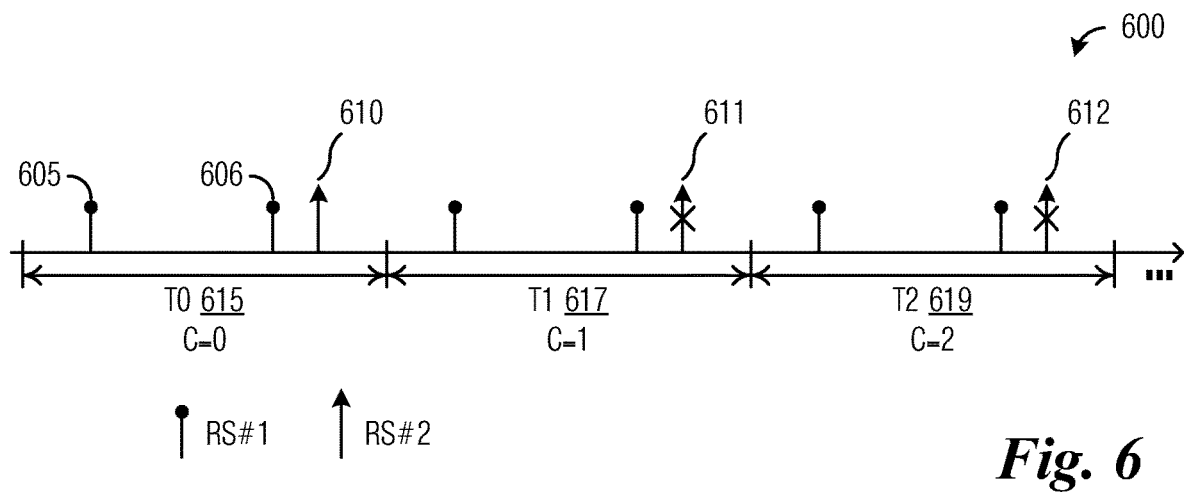
FIG. 6 illustrates a diagram of a third example sequence of BFD RSs highlighting BF measurements made during measurement periods with durations set in accordance with a shortest period of only periodic BFD RSs assessed in the evaluation of radio link quality according to example embodiments described herein.

FIG. 6 illustrates a diagram 600 of a third example sequence of BFD RSs highlighting BF measurements made during measurement periods with durations set in accordance with a shortest period of only periodic BFD RSs assessed in the evaluation of radio link quality. As shown in FIG. 6, BFD RS set q_0 comprises two BFD RSs, RS#1 shown as a vertical line with a circular end (includes RS#1s 605 and 606) and RS#2 shown as a vertical line with an arrow end (includes RS#2s 610-612), where RS#1s does not have a QCL relationship with the DMRSs of PDCCH receptions monitored by the UE and RS#2s does have a QCL relationship with the DMRSs of PDCCH receptions monitored by the UE. In other words, the UE will be assessing RS#2s and not RS#1s. Furthermore, the period of RS#2s is twice as long as the period of RS#1s, and the measurement periods are determined by the period of RS#2s. Additionally, a number of consecutive BF instances leading to beam failure is two (N=2) and is maintained by a counter C. A total of three measurement periods are shown in FIG. 6, T0 615, T1 617, and T2 619.

An RS#2 is found in each measurement period because the duration of the measurement periods is determined based on the period of the RS#2s (the only BFD RSs in BFD RS set q_0 that has a QCL relationship with the DMRSs of PDCCH receptions monitored by the UE). In T0 615, the UE assesses RS#2 610 and determines that the signal quality meets the threshold so no BF instance is reported, hence C=0. In T1 617, the UE assesses RS#2 611 and determines that the signal quality does not meet the threshold so a BF instance is reported, hence C=1. In T2 619, the UE assesses RS#2 612 and determines that the signal quality does not meet the threshold so a BF instance is reported, hence C=2.

Because C=2, the higher layer entity declares a BF and may initiate BF recovery procedures, which may include identifying one or more candidate beams, and the transmission of a BFRQ to an access node serving the UE.

Figure 7:
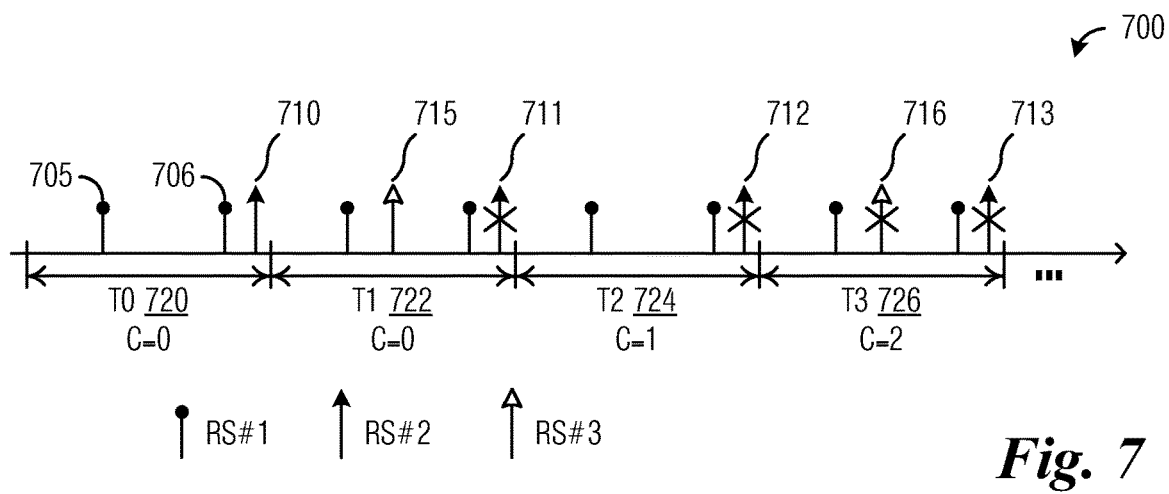
FIG. 7 illustrates a diagram of a fourth example sequence of BFD RSs highlighting BF measurements made during measurement periods with durations set in accordance with a shortest period of only periodic BFD RSs assessed in the evaluation of radio link quality according to example embodiments described herein.

FIG. 7 illustrates a diagram 700 of a fourth example sequence of BFD RSs highlighting BF measurements made during measurement periods with durations set in accordance with a shortest period of only periodic BFD RSs assessed in the evaluation of radio link quality. As shown in FIG. 7, BFD RS set q_0 comprises three BFD RSs, RS#1 shown as a vertical line with a circular end (includes RS#1s 705 and 706), RS#2 shown as a vertical line with a solid arrow end (includes RS#2s 710-713), and RS#3 shown as a vertical line with a hollow arrow end (includes RS#3 715 and 716), where RS#1s does not have a QCL relationship with the DMRSs of PDCCH receptions monitored by the UE and RS#2s and RS#3s do have a QCL relationship with the DMRSs of PDCCH receptions monitored by the UE. In other words, the UE will be assessing RS#2s and RS#3s, but not RS#1s. Furthermore, the period of RS#2s is twice as long as the period of RS#1s, the period of RS#3s is four times as long as the period of RS1s, and the measurement periods are determined by the period of RS#2s. Additionally, a number of consecutive BF instances leading to beam failure is two (N=2) and is maintained by a counter C. A total of four measurement periods are shown in FIG. 7, T0 720, T1 722, T2 724, and T3 726.

An RS#2 is found in each measurement period because the duration of the measurement periods is determined based on the period of the RS#2s (the smaller period BFD RS out of two BFD RSs in BFD RS set q_0 that have a QCL relationship with the DMRSs of PDCCH receptions monitored by the UE). In T0 720, the UE assesses RS#2 710 and determines that the signal quality meets the threshold so no BF instance is reported, hence C=0. In T1 722, the UE assesses RS#2 711 and determines that the signal quality does not meet the threshold and the UE assesses RS#3 715 and determines that the signal quality does meet the threshold. Because the signal quality of only one of the two BFD RSs being assessed meets the threshold, a BF instance is not reported, hence C=0. In T2 724, the UE assesses RS#2 712 and determines that the signal quality does not meet the threshold and that RS#2 712 is the only BFD RS being assessed so a BF instance is reported, hence C=1. In T3 726, The UE assesses RS#2 713 and determines that the signal quality does not meet the threshold and the UE assesses RS#3 716 and determines that the signal quality does not meet the threshold. Because the signal quality of both of the two BFD RSs being assessed meet the threshold, a BF instance is reported, hence C=2.

Because C=2, the higher layer entity declares a BF and may initiate BF recovery procedures, which may include identifying one or more candidate beams, and the transmission of a BFRQ to an access node serving the UE.

According to an example embodiment, a layer entity, such as a PHY layer entity, informs a higher layer entity when a radio link quality does not meet a threshold with a periodicity that is in accordance with a minimum of a longest period of periodic BFD RSs of a BFD RS set q_0 having a QCL relationship with DMRSs of PDCCH receptions monitored by the UE, or a specified time value.

According to an example embodiment, a layer entity, such as a PHY layer entity, informs a higher layer entity when a radio link quality does not meet a threshold with a periodicity that is in accordance with a longest period of periodic BFD RSs of a BFD RS set q_0 having a QCL relationship with DMRSs of PDCCH receptions monitored by the UE.

According to an example embodiment, a layer entity, such as a PHY layer entity, informs a higher layer entity when a radio link quality does not meet a threshold with a periodicity that is in accordance with a minimum of a longest period of periodic BFD RSs (from a BFD RS set q_0) used by the UE to assess the radio link quality, and a specified time value.

According to an example embodiment, a layer entity, such as a PHY layer entity, informs a higher layer entity when a radio link quality does not meet a threshold with a periodicity that is in accordance with a periodicity that is in accordance with a longest period of periodic BFD RSs (from a BFD RS set q_0) used by the UE to assess the radio link quality.

Figure 8:
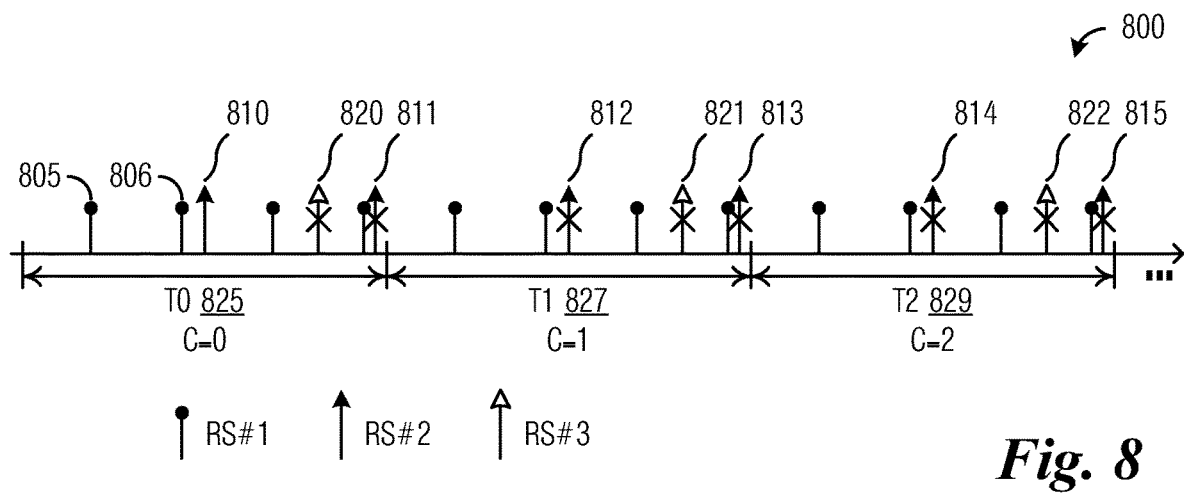
FIG. 8 illustrates a diagram of a fifth example sequence of BFD RSs highlighting BF measurements made during measurement periods with durations set in accordance with a longest period of only periodic BFD RSs assessed in the evaluation of radio link quality according to example embodiments described herein.

FIG. 8 illustrates a diagram 800 of a fifth example sequence of BFD RSs highlighting BF measurements made during measurement periods with durations set in accordance with a longest period of only periodic BFD RSs assessed in the evaluation of radio link quality. As shown in FIG. 8, BFD RS set q_0 comprises three BFD RSs, RS#1 shown as a vertical line with a circular end (includes RS#1s 805 and 806), RS#2 shown as a vertical line with a solid arrow end (includes RS#2s 810-815), and RS#3 shown as a vertical line with a hollow arrow end (includes RS#3 820-822), where RS#1s does not have a QCL relationship with the DMRSs of PDCCH receptions monitored by the UE and RS#2s and RS#3s do have a QCL relationship with the DMRSs of PDCCH receptions monitored by the UE. In other words, the UE will be assessing RS#2s and RS#3s, but not RS#1s. Furthermore, the period of RS#2s is twice as long as the period of RS#1s, the period of RS#3s is four times as long as the period of RS1s, and the measurement periods are determined by the period of RS#3s. Additionally, a number of consecutive BF instances leading to beam failure is two (N=2) and is maintained by a counter C. A total of three measurement periods are shown in FIG. 8, T0 825, T1 827, and T2 829.

Both RS#2 and RS#3 are found in each measurement period because the duration of the measurement periods is determined based on the period of RS#3 (the larger period BFD RS out of the two BFD RSs in BFD RS set q_0 that have a QCL relationship with the DMRSs of PDCCH receptions monitored by the UE). In T0 825, the UE assess RS#2 810 and RS#2 811 and determines that the signal quality of RS#2 810 does meet the threshold but the signal quality of RS#2 811 does not meet the threshold and the UE assesses RS#3 820 and determines that the signal quality does not meet the threshold. Because the signal quality of only one of the two RS#2s being assessed meets the threshold (even when RS#3 820 also does not meet the threshold), a BF instance is not reported, hence C=0. In T1 827, the UE assess RS#2 812 and RS#2 813 and determines that the signal quality of both do not meet the threshold and the UE assesses RS#3 821 and determines that the signal quality does not meet the threshold. Because the signal quality of both of the two BFD RSs being assessed does not meet the threshold, a BF instance is reported, hence C=1. In T2 829, the UE assess RS#2 814 and RS#2 815 and determines that the signal quality of both do not meet the threshold and the UE assesses RS#3 822 and determines that the signal quality does not meet the threshold. Because the signal quality of both of the two BFD RSs being assessed does not meet the threshold, a BF instance is reported, hence C=2.

Because C=2, the higher layer entity declares a BF and may initiate BF recovery procedures, which may include identifying one or more candidate beams, and the transmission of a BFRQ to an access node serving the UE.

With respect to the example embodiments presented above, the following may be applicable:
  A UE is configured, for an access node, with a BFD RS set q_0 of periodic BFD RSs (e.g., periodic CSI-RSs) or associated indices using a higher layer parameter;
  If the UE is not provided with the higher layer parameter, the UE may be able to determine the BFD RS set q_0 to include BFD RS (such as SS or PBCH block and periodic CSI-RS resource) indices with the same values as the RS indices in the RS sets conveyed by the TCI states for respective control resource sets that the UE is configured for monitoring PDCCHs;
  The periodic BFD RS resource in the BFD RS set q_0 is a single port RS;
  The UE assesses a radio link quality in accordance with the BFD RS set q_0, comparing the signal quality of the BFD RS(s) with a threshold;
  The threshold is defined as a level at which the downlink radio link cannot be reliably received and may correspond to a BLER;
  The UE assesses a radio link quality only according to BFD RSs that have a QCL relationship with the DMRSs of PDCCH receptions monitored by the UE; or
  The PHY layer entity in the UE, in slots where the radio link quality according to the BFD RS set q_0 is assessed, provides a flag or information to a higher layer entity when the radio link of all corresponding BFD RSs of the BFD RS set q_0 that the UE uses to determine the radio link quality does not meet the threshold.

With respect to the example embodiments presented above, the following may be applicable:
  A beam failure is declared if a specified number of consecutive BF instances occurs, wherein a BF instance occurs when a radio link quality for all corresponding BFD RSs of BFD RS set q_0 that the UE uses to assess the radio link quality does not meet the threshold, where the periodicity of each beam failure instance measurement is based on the periodicity of periodic BFD RSs of BFD RS set q_0, excluding the periodicity of periodic BFD RSs that are not used by the UE to assess the radio link quality.
  The specified number of consecutive BF instances is a predetermined value.
  The specified number of consecutive BF instances occurs if there have been at least a predetermined number of consecutive BF instances occurred and all BFD RSs fail at least once.

FIG. 9 illustrates a flow diagram of example operations 900 occurring in a UE making BF measurements and responding accordingly. Operations 900 may be indicative of operations occurring in a UE, such as a PHY layer entity of the UE, as the UE makes BF measurements and responds accordingly.

The UE determines a measurement period in accordance with BFD RSs of BFD RS set q_0 used by the UE to assess radio link quality (block 905). In an embodiment, the UE uses the BFD RSs of BFD RS set q_0 that have a QCL relationship with the DMRSs of PDCCH receptions monitored by the UE. In an embodiment, the UE determines the duration of the measurement period as the maximum between the shortest periodicity of the BFD RSs of BFD RS set q_0 that the UE uses to assess the radio link quality and a predetermined value. In an embodiment, the UE uses the BFD RSs of BFD RS set q_0 excluding the BFD RSs that do not have a QCL relationship with the DMRSs of PDCCH receptions monitored by the UE. In an embodiment, the UE receives signaling with information about the measurement period. The signaling may be MAC, or radio resource control (RRC) signaling. The UE monitors the BFD RSs of BFD RS set q_0 that have a QCL relationship with the DMRSs of PDCCH receptions monitored by the UE (block 907). The UE monitors the BFD RSs of BFD RS set q_0 that have a QCL relationship with the DMRSs of PDCCH receptions monitored by the UE that are present within a particular measurement period. It is noted that the BFD RSs of BFD RS set q_0 that have a QCL relationship with the DMRSs of PDCCH receptions monitored by the UE that are present within any particular measurement period may be a subset of the BFD RSs of BFD RS set q_0 that have a QCL relationship with the DMRSs of PDCCH receptions monitored by the UE. The UE performs a check to determine if the BFD RSs monitored by the UE within the particular measurement period failed (block 909). As an example, a BFD RS monitored by the UE failed if its signal quality does not meet a signal quality threshold. As an example, a BFD RS monitored by the UE failed if its BLER does not meet a BLER threshold. If all of the BFD RSs monitored by the UE within the particular measurement period failed, the UE reports a BF instance (block 911). The BF instance may be reported to a higher layer entity, e.g., a MAC layer entity, of the UE. The BF instance may be reported upon detection that all of the BFD RSs monitored by the UE within the particular measurement period failed. The BF instance may be reported during the same measurement period in which the detection that all of the BFD RSs monitored by the UE within the particular measurement period failed occurred. The BF instance may be reported in the next measurement period after the measurement period in which the detection that all of the BFD RSs monitored by the UE within the particular measurement period failed occurred. The UE may optionally report which BFD RSs monitored by the UE failed within the particular measurement period. The UE returns to block 907 to monitor BFD RSs for another measurement period. If not all of the BFD RSs monitored by the UE within the particular measurement period failed, a BF instance does not occur and one is not reported, the UE returns to block 907 to monitor BFD RSs for another measurement period.

FIG. 10 illustrates a flow diagram of example operations 1000 occurring in a UE processing BF instances and responding accordingly. Operations 1000 may be indicative of operations occurring in a UE, such as a higher layer entity, e.g., a MAC layer entity, as the UE processes BF instances and responds accordingly.

Operations 1000 begin with the UE performing a check to determine if a report of a BF instance for a current measurement report has been received (block 1005). As an example, a higher layer entity (such as a MAC layer entity) of the UE receives the BF instance from a PHY layer entity of the UE. If the UE has received a report of a BF instance, the UE increments a consecutive BF instance counter C (block 1007). The UE may have also received information about which BFD RS failed in the BF instance. If the UE received such information, the UE may update information about which BFD RSs failed (block 1009).

The UE performs a check to determine if the value of the consecutive BF instance count C meets a specified number of consecutive BF instances to declare a BF (block 1011). The specified number of consecutive BF instances to declare a BF may be specified in a technical standard or by an operator of the communications system. Alternatively, the specified number of consecutive BF instances to declare a BF is determined collaboratively by devices in the communications system. Alternatively, the specified number of consecutive BF instances to declare a BF is determined by an access node serving the UE and provided to the UE. As an example, the specified number may be sent to the UE using MAC or RRC signaling.

If the value of the consecutive BF instance count C meets the specified number of consecutive BF instances to declare a BF, the UE may perform a check to determine if all of the BFD RSs assessed by the UE have failed at least once (block 1013). If the value of the consecutive BF instance count C meets the specified number of consecutive BF instances in order to declare a BF and (optionally) all of the BFD RSs assessed by the UE have failed at least once, the UE determines that a BF has occurred (block 1015). It is noted that in this option, the condition checked in block 1011 may be changed to if the value of the consecutive BF instance count C is greater than or equal to the specified number of consecutive BF instances. The greater than or equal to condition may help to ensure that additional time is granted to allow all BFD RSs to be detected as being faulty. The occurrence of the BF may initiate a BF recovery procedure, which may include determination (e.g., identification) of one or more candidate beams, transmission of a BFRQ, and so on. The BFRQ may explicitly include information about the one or more candidate beams, such as beam index, code index, and so on. The BFRQ may implicitly include information about the one or more candidate beams. As an example, the BFRQ may be transmitted using a beam that is associated with the one or more candidate beams. In other words, the BFRQ is transmitted using a beam that corresponds to the one or more candidate beams. In another example, the BFRQ may be transmitted on a resource that is associated with the one or more candidate beams. After the BF recovery procedure, the UE returns to block 1005 to perform a check to determine if a report of a BF instance has been received.

If the value of the consecutive BF instance count C does not meet the specified number of consecutive BF instances in order to declare a BF, the UE returns to block 1005 to perform a check to determine if a report of a BF instance has been received. If the value of the consecutive BF instance count C meets the specified number of consecutive BF instances in order to declare a BF but if all BFD RSs assessed by the UE have not failed at least once, the UE returns to block 1005 to perform a check to determine if a report of a BF instance has been received.

If a BF instance for the current measurement report has not been reported, the UE resets the consecutive BF instance count C (block 1017) and the UE may reset the information about which BFD RSs failed (block 1019). The UE returns to block 1005 to perform a check to determine if a report of a BF instance has been received.

As discussed previously, an access node may transmit one or more BFD RSs in a measurement period for use by a UE in determining if the UE is properly receiving beamformed transmissions. The access node might transmit different BFD RSs with different periodicities, but the access node typically transmits any one BFD RS on a regular schedule. An entity in the PHY layer of the UE performs measurements on the BFD RSs that the UE receives in a measurement period to determine if the BFD RSs meet a specified quality threshold. A beam failure instance is considered to occur in a measurement period when all of the BFD RSs in that measurement period fail to meet the specified quality threshold. If any BFD RS in a measurement period meets the specified quality threshold, a beam failure instance is not considered to occur in that measurement period.

If the PHY layer entity determines that a beam failure instance has occurred in a measurement period, the PHY layer entity sends information regarding the beam failure instance to an entity in the MAC layer of the UE. The PHY layer entity may send information regarding beam failure instances to the MAC layer entity at periodic intervals. If the MAC layer entity receives a specified number of consecutive times N information regarding beam failure instances from the PHY layer entity, the MAC layer entity may declare that a beam failure has occurred. The number N may be specified by a technical standard, an operator of the communications system, set based on historical data, set through collaboration between the communicating devices, and so on. The MAC layer entity maintains a counter of the number of consecutive measurement periods in which a beam failure instance has occurred. The counter is reset to zero when the MAC layer entity does not receive information regarding a beam failure instance in a measurement period.

An issue that might arise in such beam failure detection scenarios is that, even though a BFD RS is configured to be transmitted during a measurement period, it is possible that the BFD RS is not transmitted in some instances. For example, in the 3GPP technical standards, resource elements overlapping with a configured control resource set or declared as reserved are to be counted in the mapping process but are not assumed to be used for transmission of the CSI-RS. Hence, the UE is not expected to receive a CSI-RS in resource elements overlapping with certain control signals. Therefore, if a periodic CSI-RS overlaps with such a control signal in a slot, it is possible that the CSI-RS will not be transmitted. If a periodic CSI-RS is used as a BFD RS in such a case, a BFD RS will not be transmitted in a time period in which a BFD RS is scheduled to be transmitted.

In other words, the access node might schedule a CSI-RS to be transmitted periodically, once every ten milliseconds for example, using a specified set of time or frequency resources. The access node might also schedule other signals, such as control signals, on the same resources that were periodically scheduled for the CSI-RS, causing the CSI-RS and the control signals to overlap. In such a case, because control signaling is considered more important, the access node sends the control information instead of sending the CSI-RS. In terms of allocation and mapping, the CSI-RS is considered to be mapped to the resources but is not transmitted. Thus, the UE does not receive a CSI-RS in resource elements overlapped with the configured control signals. If such a CSI-RS is used as a BFD RS, the UE does not receive a BFD RS in a time interval when a BFD RS could be expected.

If a BFD RS is not transmitted by the base station during a measurement period, there is no BFD RS during that measurement period whose signal quality is below the beam quality threshold, so the PHY layer entity will not report a beam failure instance to the MAC layer entity. Because there is no report from the PHY layer entity regarding a beam failure instance, the MAC layer entity considers no beam failure instance to have occurred in that measurement period, and the MAC layer entity resets its counter for counting consecutive occurrences of beam failure instances. The counter might then have an incorrect value compared to a case where a BFD RS had been transmitted in that measurement period and a beam failure instance had occurred.

In other words, currently, if no BFD RS is transmitted during a measurement period, that measurement period is considered to be a period where a beam failure instance has not occurred.

Figure 11:
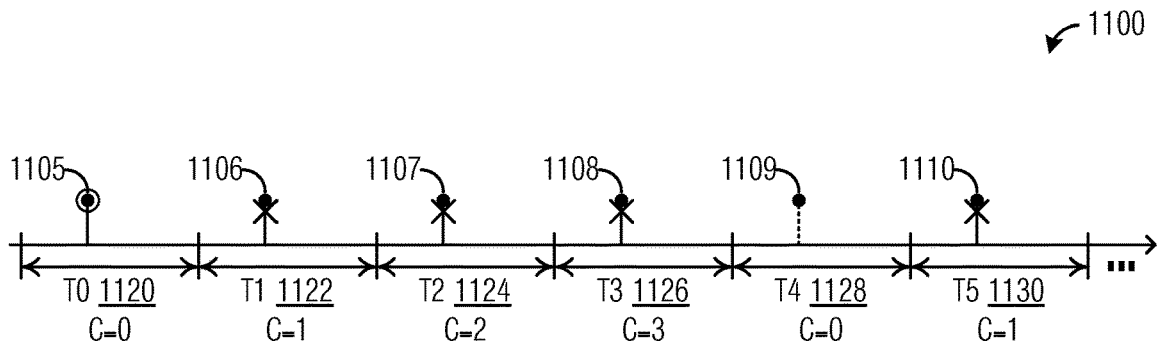
FIG. 11 illustrates a diagram of an example sequence of BFD RSs highlighting the impact of a measurement period with no BFD RS transmission on a counter for counting consecutive occurrences of beam failure instances accordingly according to example embodiments described herein.

FIG. 11 illustrates a diagram 1100 of an example sequence of BFD RSs highlighting the impact of a measurement period with no BFD RS transmission on a counter for counting consecutive occurrences of beam failure instances. As shown in FIG. 11, there is one BFD RS scheduled for transmission in each measurement period. For example, BFD RS 1105 is scheduled for transmission in measurement period 1120, and at a UE, the quality of BFD RS 1105 exceeds a specified quality threshold, so no beam failure instance is declared. Hence, the counter for counting consecutive occurrences of beam failure instances (hereby referred to hereinafter as counter C) is reset to zero. Furthermore, BFD RS 1106 is scheduled for transmission in measurement period 1122, BFD RS 1107 is scheduled for transmission in measurement period 1124, and BFD RS 1108 is scheduled for transmission in measurement period 1126. However, the qualities of BFD RSs 1106-1108 do not exceed the specified quality threshold, so beam failure instances are declared in measurement periods 1122-1126 and counter C is incremented in each measurement period until reaching the value three in measurement period 1126.

BFD RS 1109 is scheduled for transmission in measurement period 1128, however, BFD RS 1109 is not transmitted, due to an overlapping control signal, for example. Because BFD RS 1109 is scheduled but not transmitted, the UE deems that no beam failure instance occurred in measurement period 1128. Therefore, counter C is reset back to zero. BFD RS 1110 is scheduled for transmission in measurement period 1130 and is transmitted. At the UE, the quality of BFD RS 1110 does not meet the specified quality threshold, so a beam failure instance is declared and counter C is incremented to one. Because the value of counter C does not exceed a beam failure threshold (e.g., four in this example), no beam failure is declared, even though four consecutive BFD RS transmitted (BFD RSs 1106, 1107, 1108, and 1110) did not meet the specified quality threshold at the UE. It might be preferable that a beam failure be declared in such a case.

According to an example embodiment, if no BFD RS is transmitted during a measurement period, the measurement period is not considered to be a measurement period where a beam failure instance has not occurred. In other words, if no BFD RS is transmitted during a measurement period (due to either no BFD RS being scheduled during the measurement period or if a BFD RS was scheduled but not transmitted), then the measurement period is not considered to be a measurement period where a beam failure instance has not occurred. In an embodiment, if no BFD RS is transmitted during a measurement period, the measurement period is ignored in updating counter C. In an embodiment, if no BFD RS is transmitted during a measurement period, the measurement period is considered to be a measurement period where a beam failure instance occurred. In other words, the counter C is incremented during the measurement period where no BFD RS is transmitted.

Figure 12:
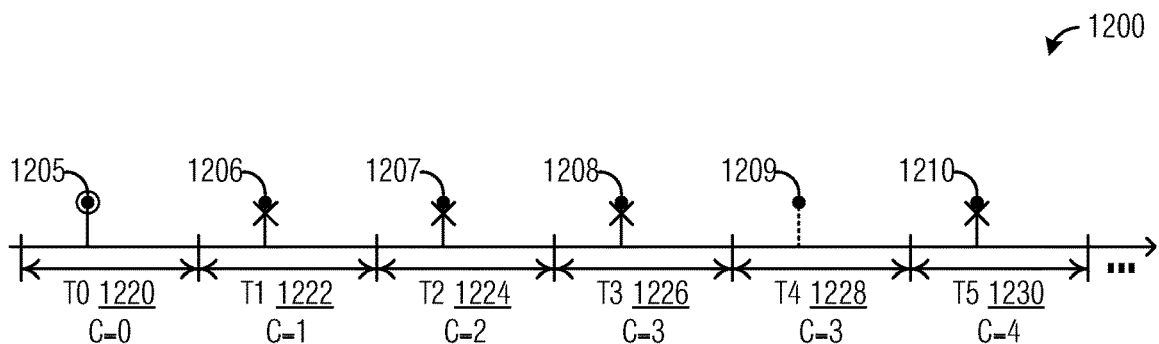
FIG. 12 illustrates a diagram of an example sequence of BFD RSs highlighting a first consideration of a measurement period with no BFD RS transmission accordingly according to example embodiments described herein.

FIG. 12 illustrates a diagram 1200 of an example sequence of BFD RSs highlighting a first consideration of a measurement period with no BFD RS transmission. As discussed previously, the first consideration of a measurement period with no BFD RS transmission is to ignore the measurement period in updating counter C. As shown in FIG. 12, there is one BFD RS scheduled for transmission in each measurement period. For example, BFD RS 1205 is scheduled for transmission in measurement period 1220, and at a UE, the quality of BFD RS 1205 exceeds a specified quality threshold, so no beam failure instance is declared. Hence, counter C is reset to zero. Furthermore, BFD RS 1206 is scheduled for transmission in measurement period 1222, BFD RS 1207 is scheduled for transmission in measurement period 1224, and BFD RS 1208 is scheduled for transmission in measurement period 1226. However, the qualities of BFD RSs 1206-1208 do not exceed the specified quality threshold, so beam failure instances are declared in measurement periods 1222-1226 and counter C is incremented in each measurement period until reaching the value three in measurement period 1226.

BFD RS 1209 is scheduled for transmission in measurement period 1228, however, BFD RS 1209 is not transmitted, due to an overlapping control signal, for example. Because BFD RS 1209 is scheduled but not transmitted, measurement period 1228 is ignored in updating counter C. Hence, counter C in measurement period 1228 remains at three. In other words, rather than counter C being reset to zero when there is no BFD RS in a measurement period, as in measurement period 1228, in an embodiment, the value of counter C is not changed when there is no BFD RS in a measurement period, as in measurement period 1228. Thus, it can be seen that, in measurement period 1228, counter C retains the value it had in measurement period 1226. BFD RS 1210 is scheduled for transmission in measurement period 1230 and is transmitted. At the UE, the quality of BFD RS 1210 does not meet the specified quality threshold, so a beam failure instance is declared and counter C is incremented to four. If counter C exceeds the beam failure threshold, a beam failure is declared.

Figure 13:
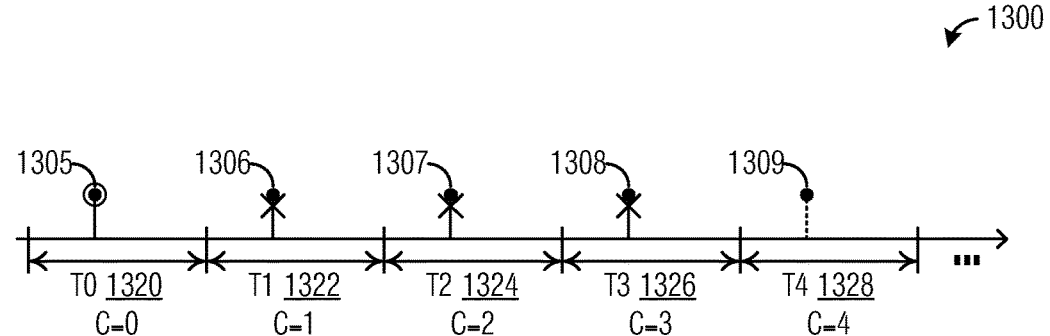
FIG. 13 illustrates a diagram of an example sequence of BFD RSs highlighting a second consideration of a measurement period with no BFD RS transmission accordingly according to example embodiments described herein.

FIG. 13 illustrates a diagram 1300 of an example sequence of BFD RSs highlighting a second consideration of a measurement period with no BFD RS transmission. As discussed previously, the second consideration of a measurement period with no BFD RS transmission is to treat the measurement period as a measurement period with a beam failure instance. As discussed previously, the second consideration of a measurement period with no BFD RS transmission is to increment counter C. As shown in FIG. 13, there is one BFD RS scheduled for transmission in each measurement period. For example, BFD RS 1305 is scheduled for transmission in measurement period 1320, and at a UE, the quality of BFD RS 1305 exceeds a specified quality threshold, so no beam failure instance is declared. Hence, counter C is reset to zero. Furthermore, BFD RS 1306 is scheduled for transmission in measurement period 1322, BFD RS 1307 is scheduled for transmission in measurement period 1324, and BFD RS 1308 is scheduled for transmission in measurement period 1326. However, the qualities of BFD RSs 1306-1308 do not exceed the specified quality threshold, so beam failure instances are declared in measurement periods 1322-1326 and counter C is incremented in each measurement period until reaching the value three in measurement period 1326.

BFD RS 1309 is scheduled for transmission in measurement period 1328, however, BFD RS 1309 is not transmitted, due to an overlapping control signal, for example. Because BFD RS 1309 is scheduled but not transmitted, a beam failure instance is considered to have occurred in measurement period 1328 and counter C is incremented to four. In other words, rather than counter C being reset to zero when there is no BFD RS in a measurement period, as in measurement period 1328, in an embodiment, the value of counter C is incremented by one when there is no BFD RS in a measurement period, as in measurement period 1328. Thus, it can be seen that, in measurement period 1328, counter C's value increases from three to four. If counter C exceeds the beam failure threshold, a beam failure is declared.

In some cases, the PHY layer entity might be aware of whether or not a BFD RS transmission occurred in a measurement period. In an embodiment, when the PHY layer entity reports a beam failure instance to the MAC layer entity, the PHY layer includes in the report an information conveying whether or not a BFD-RS transmission occurred in that measurement period.

In some cases, the MAC layer entity might be aware that a BFD RS transmission did not occur in a measurement period. Without such awareness, the MAC layer entity might assume that a beam failure did not occur when there is no report from the PHY layer entity regarding a beam failure instance. In an embodiment, when the MAC layer entity is aware that a BFD RS transmission did not occur in a measurement period, the MAC layer entity ignores the fact that the MAC layer entity did not receive a report from the PHY layer entity regarding a beam failure instance.

Figure 14:
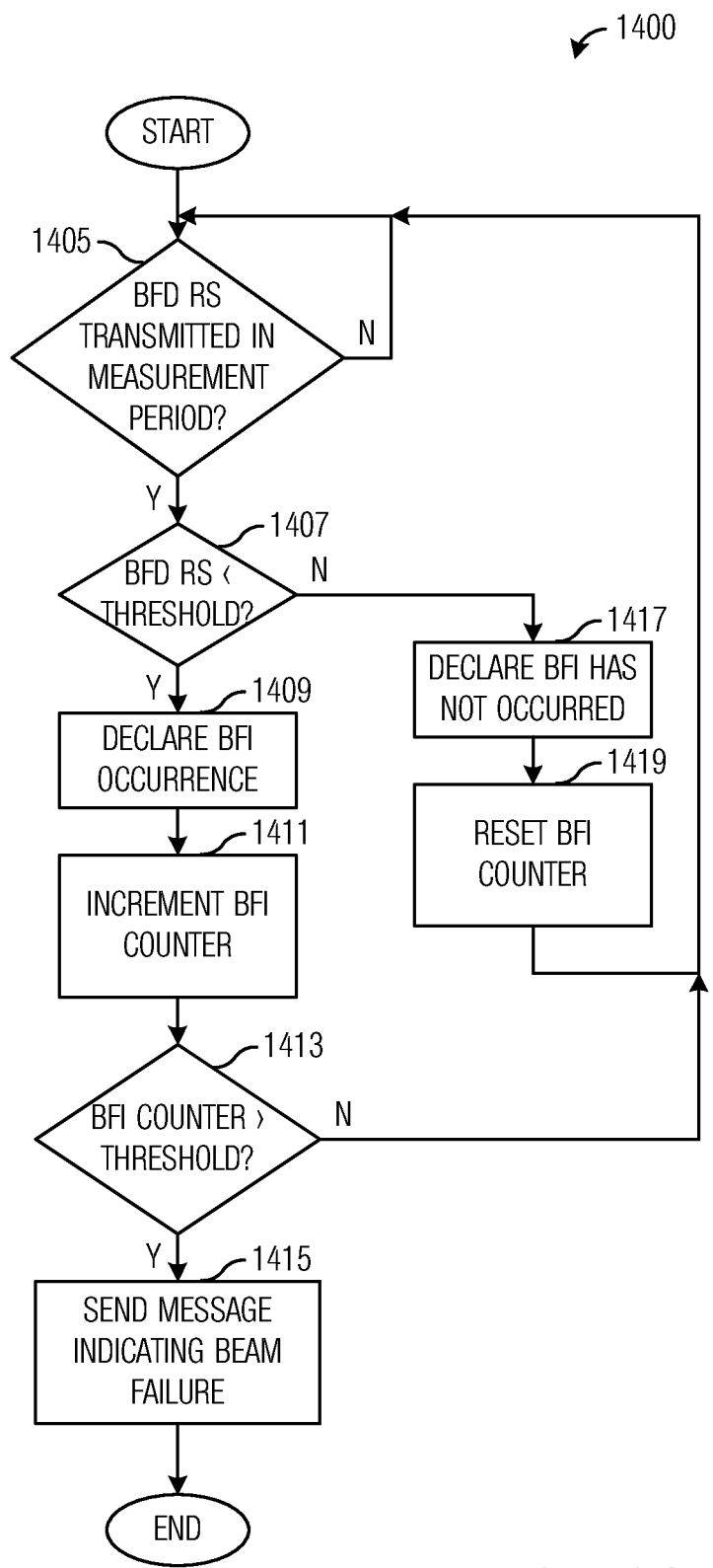
FIG. 14 illustrates a flow diagram of first example operations occurring in a UE detecting BFD RSs to determine beam failures accordingly according to example embodiments described herein.

FIG. 14 illustrates a flow diagram of first example operations 1400 occurring in a UE detecting BFD RSs to determine beam failures. Operations 1400 may be indicative of operations occurring in a UE as the UE detects BFD RSs to determine beam failures.

Operations 1400 begin with the UE performing a check to determine if one or more BFD RSs were transmitted in a measurement period (block 1405). As an example, one or more BFD RSs are transmitted in the measurement period if they were scheduled for transmission and if did not overlap with control signaling. If there are not BFD RSs transmitted in the measurement period, the UE returns to continue monitoring for BFD RSs and block 1405. If the one or more BFD RS were transmitted in the measurement period, the UE performs a check to determine if signal qualities of the BFD RSs are lower than a specified quality threshold (block 1407). If the signal qualities of the BFD RSs are lower that the specified quality threshold, then the UE declares an occurrence of a beam failure instance (block 1409). As an example, if there are more than one BFD RSs transmitted in the measurement period, then all of the signal qualities of the BFD RSs have to be lower than the specified quality threshold for the UE to declare that a beam failure instance has occurred. The UE increments a beam failure instance counter (e.g., counter C) (block 1411).

The UE performs a check to determine if the beam failure instance counter exceeds a beam failure threshold (block 1413). If the beam failure instance counter exceeds the beam failure threshold, the UE sends a message with information regarding a beam failure (block 1415). If the beam failure instance counter does not exceed the beam failure threshold, the UE returns to continue monitoring for BFD RSs and block 1405.

If the signal qualities of the BFD RSs are not lower that the specified quality threshold, the UE declares that a beam failure instance has not occurred (block 1417). As an example, if there are more than one BFD RSs transmitted in the measurement period, then only one of the signal qualities of the BFD RSs have to be not lower than the specified quality threshold for the UE to declare that a beam failure instance has not occurred. The UE also resets the beam failure instance counter (block 1419). The UE resets the beam failure instance counter to zero, for example The UE returns to continue monitoring for BFD RSs and block 1405.

Figure 15:
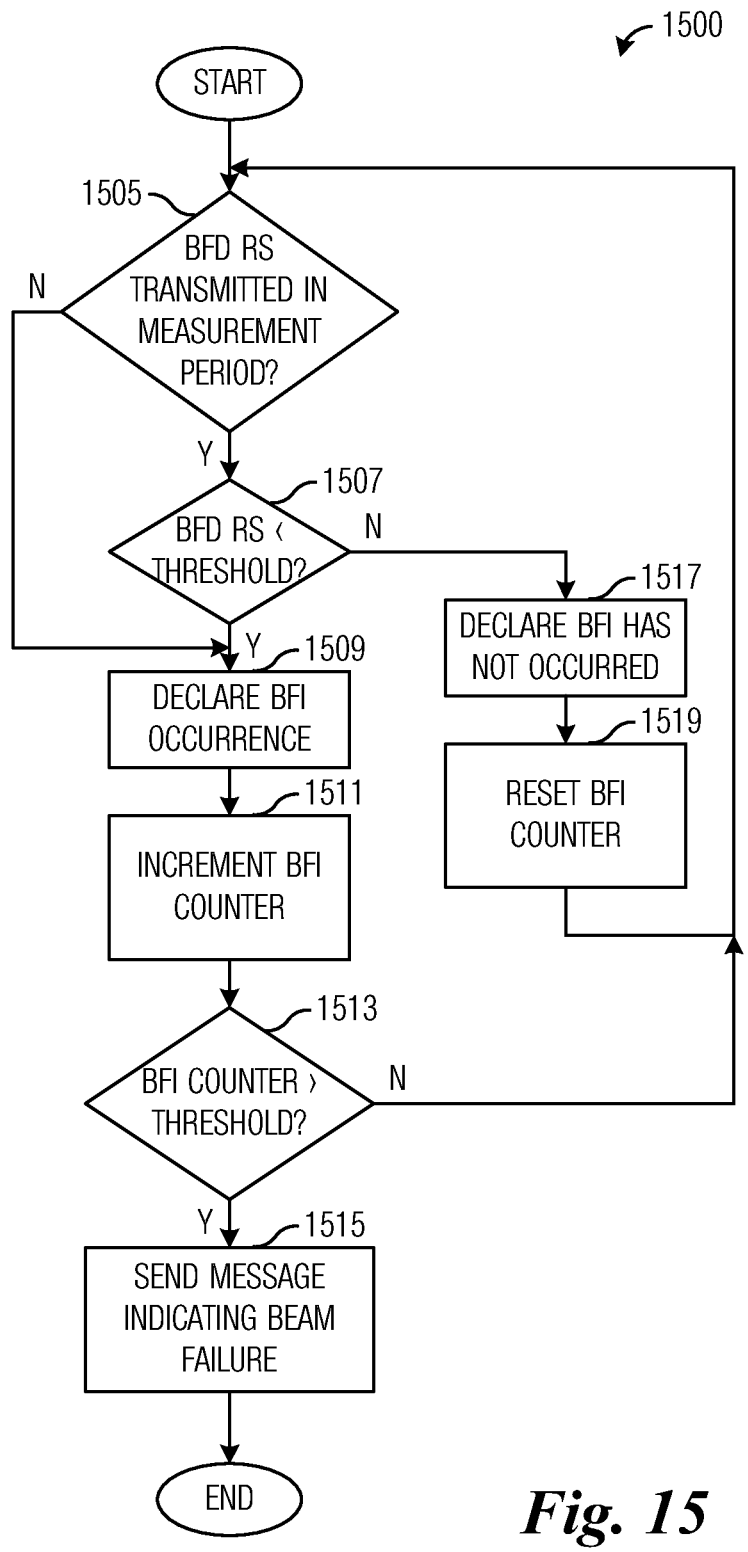
FIG. 15 illustrates a flow diagram of second example operations occurring in a UE detecting BFD RSs to determine beam failures accordingly according to example embodiments described herein.

FIG. 15 illustrates a flow diagram of second example operations 1500 occurring in a UE detecting BFD RSs to determine beam failures. Operations 1500 may be indicative of operations occurring in a UE as the UE detects BFD RSs to determine beam failures.

Operations 1500 begin with the UE performing a check to determine if one or more BFD RSs were transmitted in a measurement period (block 1505). As an example, one or more BFD RSs are transmitted in the measurement period if they were scheduled for transmission and if did not overlap with control signaling. If the one or more BFD RS were transmitted in the measurement period, the UE performs a check to determine if signal qualities of the BFD RSs are lower than a specified quality threshold (block 1507). If the signal qualities of the BFD RSs are lower that the specified quality threshold, then the UE declares an occurrence of a beam failure instance (block 1509). As an example, if there are more than one BFD RSs transmitted in the measurement period, then all of the signal qualities of the BFD RSs have to be lower than the specified quality threshold for the UE to declare that a beam failure instance has occurred. The UE increments a beam failure instance counter (e.g., counter C) (block 1511).

The UE performs a check to determine if the beam failure instance counter exceeds a beam failure threshold (block 1513). If the beam failure instance counter exceeds the beam failure threshold, the UE sends a message with information regarding a beam failure (block 1515). If the beam failure instance counter does not exceed the beam failure threshold, the UE returns to continue monitoring for BFD RSs and block 1505.

If the signal qualities of the BFD RSs are not lower that the specified quality threshold, the UE declares that a beam failure instance has not occurred (block 1517). As an example, if there are more than one BFD RSs transmitted in the measurement period, then only one of the signal qualities of the BFD RSs have to be not lower than the specified quality threshold for the UE to declare that a beam failure instance has not occurred. The UE also resets the beam failure instance counter, to zero, for example (block 1519). The UE returns to continue monitoring for BFD RSs and block 1505.

If one or more BFD RSs were not transmitted in the measurement period, the UE declares an occurrence of a beam failure instance (block 1509). In other words, if there were no BFD RSs transmitted in the measurement period, the UE declares an occurrence of a beam failure instance. The UE increments a beam failure instance counter (e.g., counter C) (block 1511). The UE performs a check to determine if the beam failure instance counter exceeds a beam failure threshold (block 1513). If the beam failure instance counter exceeds the beam failure threshold, the UE sends a message with information regarding a beam failure (block 1515). If the beam failure instance counter does not exceed the beam failure threshold, the UE returns to continue monitoring for BFD RSs and block 1505.

Figure 16:
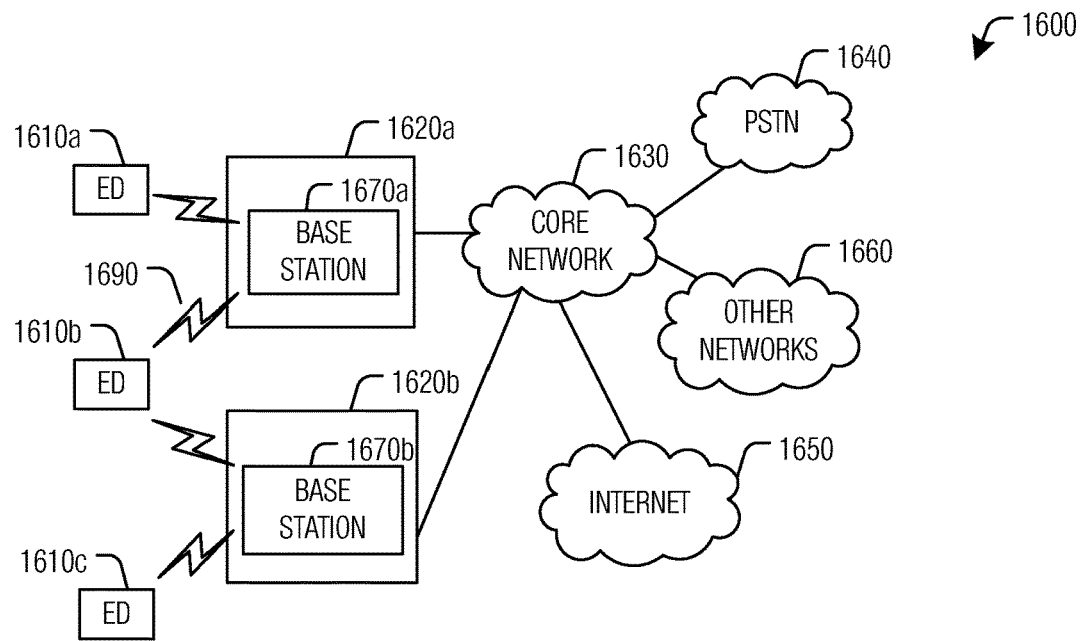
FIG. 16 illustrates an example communication system according to example embodiments described herein.

FIG. 16 illustrates an example communication system 1600. In general, the system 1600 enables multiple wireless or wired users to transmit and receive data and other content. The system 1600 may implement one or more channel access methods, such as code division multiple access (CDMA), time division multiple access (TDMA), frequency division multiple access (FDMA), orthogonal FDMA (OFDMA), single-carrier FDMA (SC-FDMA), or non-orthogonal multiple access (NOMA).

In this example, the communication system 1600 includes electronic devices (ED) 1610a-1610c, radio access networks (RANs) 1620a-1620b, a core network 1630, a public switched telephone network (PSTN) 1640, the Internet 1650, and other networks 1660. While certain numbers of these components or elements are shown in FIG. 16, any number of these components or elements may be included in the system 1600.

The EDs 1610a-1610c are configured to operate or communicate in the system 1600. For example, the EDs 1610a-1610c are configured to transmit or receive via wireless or wired communication channels. Each ED 1610a-1610c represents any suitable end user device and may include such devices (or may be referred to) as a user equipment or device (UE), wireless transmit or receive unit (WTRU), mobile station, fixed or mobile subscriber unit, cellular telephone, personal digital assistant (PDA), smartphone, laptop, computer, touchpad, wireless sensor, or consumer electronics device.

The RANs 1620a-1620b here include base stations 1670a-1670b, respectively. Each base station 1670a-1670b is configured to wirelessly interface with one or more of the EDs 1610a-1610c to enable access to the core network 1630, the PSTN 1640, the Internet 1650, or the other networks 1660. For example, the base stations 1670a-1670b may include (or be) one or more of several well-known devices, such as a base transceiver station (BTS), a Node-B (NodeB), an evolved NodeB (eNodeB), a Next Generation (NG) NodeB (gNB), a Home NodeB, a Home eNodeB, a site controller, an access point (AP), or a wireless router. The EDs 1610a-1610c are configured to interface and communicate with the Internet 1650 and may access the core network 1630, the PSTN 1640, or the other networks 1660.

In the embodiment shown in FIG. 16, the base station 1670a forms part of the RAN 1620a, which may include other base stations, elements, or devices. Also, the base station 1670b forms part of the RAN 1620b, which may include other base stations, elements, or devices. Each base station 1670a-1670b operates to transmit or receive wireless signals within a particular geographic region or area, sometimes referred to as a "cell." In some embodiments, multiple-input multiple-output (MIMO) technology may be employed having multiple transceivers for each cell.

The base stations 1670a-1670b communicate with one or more of the EDs 1610a-1610c over one or more air interfaces 1690 using wireless communication links. The air interfaces 1690 may utilize any suitable radio access technology.

It is contemplated that the system 1600 may use multiple channel access functionality, including such schemes as described above. In particular embodiments, the base stations and EDs implement 5G New Radio (NR), LTE, LTE-A, or LTE-B. Of course, other multiple access schemes and wireless protocols may be utilized.

The RANs 1620a-1620b are in communication with the core network 1630 to provide the EDs 1610a-1610c with voice, data, application, Voice over Internet Protocol (VoIP), or other services. Understandably, the RANs 1620a-1620b or the core network 1630 may be in direct or indirect communication with one or more other RANs (not shown). The core network 1630 may also serve as a gateway access for other networks (such as the PSTN 1640, the Internet 1650, and the other networks 1660). In addition, some or all of the EDs 1610a-1610c may include functionality for communicating with different wireless networks over different wireless links using different wireless technologies or protocols. Instead of wireless communication (or in addition thereto), the EDs may communicate via wired communication channels to a service provider or switch (not shown), and to the Internet 1650.

Although FIG. 16 illustrates one example of a communication system, various changes may be made to FIG. 16. For example, the communication system 1600 could include any number of EDs, base stations, networks, or other components in any suitable configuration.

Figure 17A:
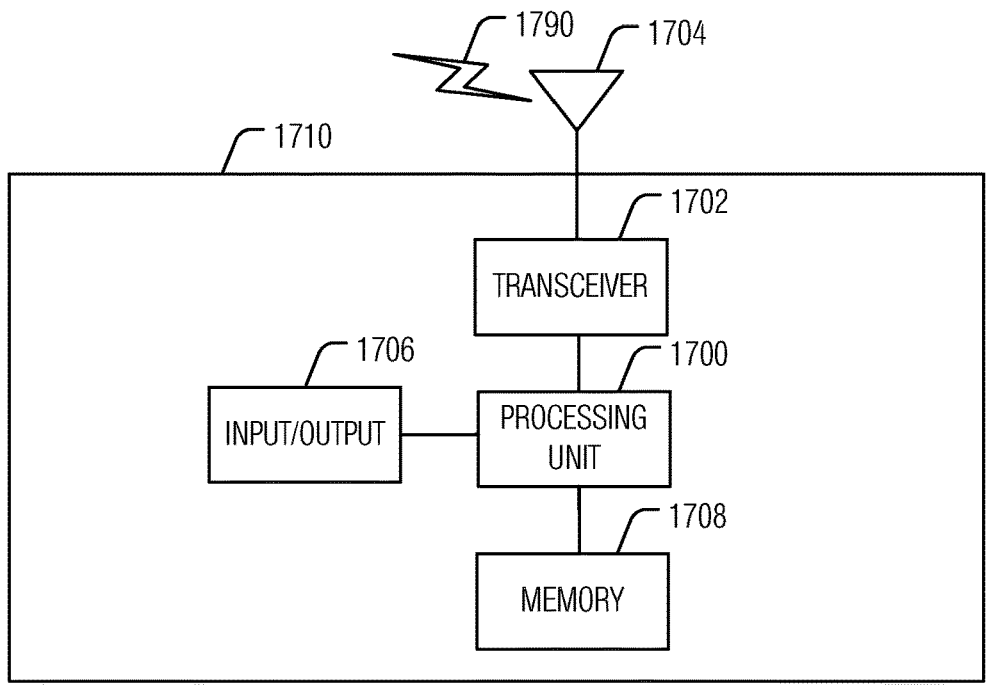
FIGS. 17A and 17B illustrate example devices that may implement the methods and teachings according to this disclosure.
Figure 17B:
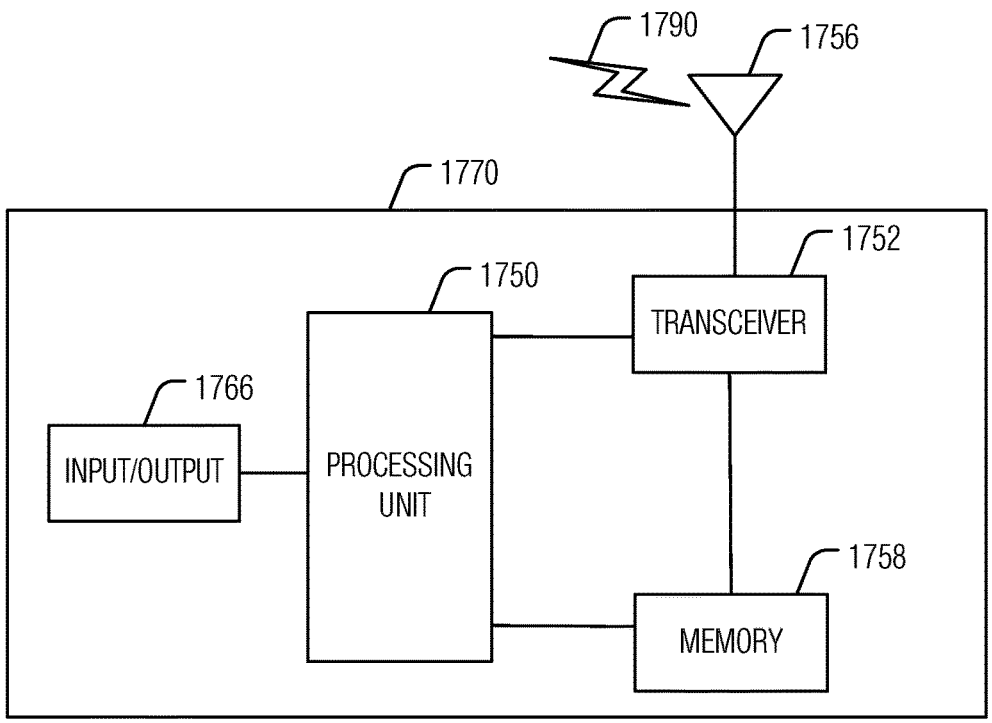

FIGS. 17A and 17B illustrate example devices that may implement the methods and teachings according to this disclosure. In particular, FIG. 17A illustrates an example ED 1710, and FIG. 17B illustrates an example base station 1770. These components could be used in the system 1600 or in any other suitable system.

As shown in FIG. 17A, the ED 1710 includes at least one processing unit 1700. The processing unit 1700 implements various processing operations of the ED 1710. For example, the processing unit 1700 could perform signal coding, data processing, power control, input/output processing, or any other functionality enabling the ED 1710 to operate in the system 1600. The processing unit 1700 also supports the methods and teachings described in more detail above. Each processing unit 1700 includes any suitable processing or computing device configured to perform one or more operations. Each processing unit 1700 could, for example, include a microprocessor, microcontroller, digital signal processor, field programmable gate array, or application specific integrated circuit.

The ED 1710 also includes at least one transceiver 1702. The transceiver 1702 is configured to modulate data or other content for transmission by at least one antenna or NIC (Network Interface Controller) 1704. The transceiver 1702 is also configured to demodulate data or other content received by the at least one antenna 1704. Each transceiver 1702 includes any suitable structure for generating signals for wireless or wired transmission or processing signals received wirelessly or by wire. Each antenna 1704 includes any suitable structure for transmitting or receiving wireless or wired signals. One or multiple transceivers 1702 could be used in the ED 1710, and one or multiple antennas 1704 could be used in the ED 1710. Although shown as a single functional unit, a transceiver 1702 could also be implemented using at least one transmitter and at least one separate receiver.

The ED 1710 further includes one or more input/output devices 1706 or interfaces (such as a wired interface to the Internet 1650). The input/output devices 1706 facilitate interaction with a user or other devices (network communications) in the network. Each input/output device 1706 includes any suitable structure for providing information to or receiving information from a user, such as a speaker, microphone, keypad, keyboard, display, or touch screen, including network interface communications.

In addition, the ED 1710 includes at least one memory 1708. The memory 1708 stores instructions and data used, generated, or collected by the ED 1710. For example, the memory 1708 could store software or firmware instructions executed by the processing unit(s) 1700 and data used to reduce or eliminate interference in incoming signals. Each memory 1708 includes any suitable volatile or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 17B, the base station 1770 includes at least one processing unit 1750, at least one transceiver 1752, which includes functionality for a transmitter and a receiver, one or more antennas 1756, at least one memory 1758, and one or more input/output devices or interfaces 1766. A scheduler, which would be understood by one skilled in the art, is coupled to the processing unit 1750. The scheduler could be included within or operated separately from the base station 1770. The processing unit 1750 implements various processing operations of the base station 1770, such as signal coding, data processing, power control, input/output processing, or any other functionality. The processing unit 1750 can also support the methods and teachings described in more detail above. Each processing unit 1750 includes any suitable processing or computing device configured to perform one or more operations. Each processing unit 1750 could, for example, include a microprocessor, microcontroller, digital signal processor, field programmable gate array, or application specific integrated circuit.

Each transceiver 1752 includes any suitable structure for generating signals for wireless or wired transmission to one or more EDs or other devices. Each transceiver 1752 further includes any suitable structure for processing signals received wirelessly or by wire from one or more EDs or other devices. Although shown combined as a transceiver 1752, a transmitter and a receiver could be separate components. Each antenna 1756 includes any suitable structure for transmitting or receiving wireless or wired signals. While a common antenna 1756 is shown here as being coupled to the transceiver 1752, one or more antennas 1756 could be coupled to the transceiver(s) 1752, allowing separate antennas 1756 to be coupled to the transmitter and the receiver if equipped as separate components. Each memory 1758 includes any suitable volatile or non-volatile storage and retrieval device(s). Each input/output device 1766 facilitates interaction with a user or other devices (network communications) in the network. Each input/output device 1766 includes any suitable structure for providing information to or receiving/providing information from a user, including network interface communications.

Figure 18:
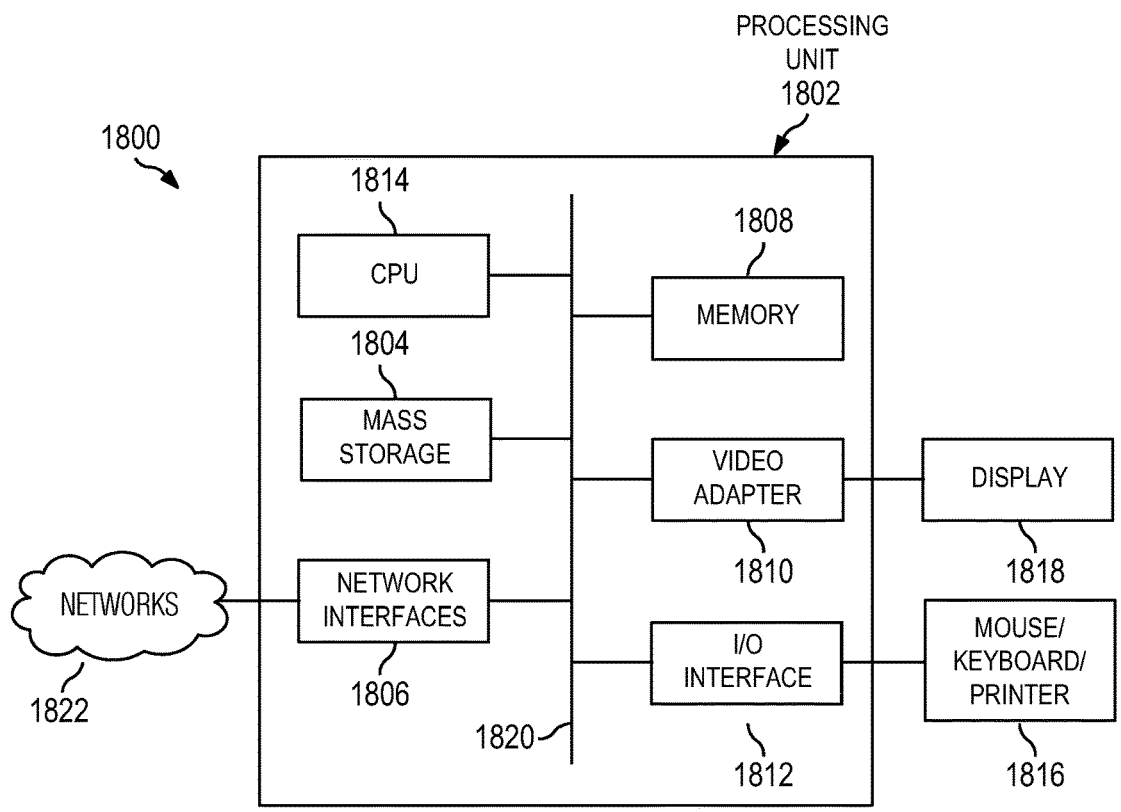
FIG. 18 is a block diagram of a computing system that may be used for implementing the devices and methods disclosed herein.

FIG. 18 is a block diagram of a computing system 1800 that may be used for implementing the devices and methods disclosed herein. For example, the computing system can be any entity of UE, access network (AN), mobility management (MM), session management (SM), user plane gateway (UPGW), or access stratum (AS). Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1800 includes a processing unit 1802. The processing unit includes a central processing unit (CPU) 1814, memory 1808, and may further include a mass storage device 1804, a video adapter 1810, and an I/O interface 1812 connected to a bus 1820.

The bus 1820 may be one or more of any type of several bus architectures including a memory bus or memory controller, a peripheral bus, or a video bus. The CPU 1814 may comprise any type of electronic data processor. The memory 1808 may comprise any type of non-transitory system memory such as static random access memory (SRAM), dynamic random access memory (DRAM), synchronous DRAM (SDRAM), read-only memory (ROM), or a combination thereof. In an embodiment, the memory 1808 may include ROM for use at boot-up, and DRAM for program and data storage for use while executing programs.

The mass storage 1804 may comprise any type of non-transitory storage device configured to store data, programs, and other information and to make the data, programs, and other information accessible via the bus 1820. The mass storage 1804 may comprise, for example, one or more of a solid state drive, hard disk drive, a magnetic disk drive, or an optical disk drive.

The video adapter 1810 and the I/O interface 1812 provide interfaces to couple external input and output devices to the processing unit 1802. As illustrated, examples of input and output devices include a display 1818 coupled to the video adapter 1810 and a mouse, keyboard, or printer 1816 coupled to the I/O interface 1812. Other devices may be coupled to the processing unit 1802, and additional or fewer interface cards may be utilized. For example, a serial interface such as Universal Serial Bus (USB) (not shown) may be used to provide an interface for an external device.

The processing unit 1802 also includes one or more network interfaces 1806, which may comprise wired links, such as an Ethernet cable, or wireless links to access nodes or different networks. The network interfaces 1806 allow the processing unit 1802 to communicate with remote units via the networks. For example, the network interfaces 1806 may provide wireless communication via one or more transmitters/transmit antennas and one or more receivers/receive antennas. In an embodiment, the processing unit 1802 is coupled to a local-area network 1822 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a determining unit or module, a reporting unit or module, an incrementing unit or module, a declaring unit or module, an updating unit or module, a resetting unit or module, a detecting unit or module, or a monitoring unit or module. The respective units or modules may be hardware, software, or a combination thereof. For instance, one or more of the units or modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method implemented by a user equipment (UE), the method comprising:
    determining, by the UE, a duration of a measurement period in accordance with a maximum of a shortest period of beam failure detection reference signal(s) and a specified time value, wherein the duration of the measurement period is an integer multiple of the shortest period of beam failure detection reference signal(s) when the shortest period of beam failure detection reference signal(s) exceeds the specified time value;
    monitoring, by the UE, at least a subset of the beam failure detection reference signal(s) during the measurement period;
    incrementing a beam failure indication (BFI) counter each time a reference signal received power (RSRP) measurement of the subset of beam failure detection reference signal(s) fails to exceed an RSRP threshold; and
    resetting, by the UE, the BFI counter in response to determining that the BFI counter is less than a failure threshold upon expiration of the measurement period.

2. The method of claim 1, wherein the UE monitors all of the beam failure detection reference signal(s) that occur during the measurement period.

3. The method of claim 1, wherein the beam failure detection reference signal(s) include channel state information reference signals (CSI-RSs).

4. The method of claim 1, wherein the beam failure detection reference signal(s) include synchronization signals.

5. A user equipment (UE) comprising:
    a processor; and
    a non-transitory computer readable storage medium storing programming for execution by the processor, the programming including instructions to:
    determine a duration of a measurement period in accordance with a maximum of a shortest period of beam failure detection reference signal(s) and a specified time value, wherein the duration of the measurement period is an integer multiple of the shortest period of beam failure detection reference signal(s) when the shortest period of beam failure detection reference signal(s) exceeds the specified time value;
    monitor at least a subset of the beam failure detection reference signal(s) during the measurement period;
    incrementing a beam failure indication (BFI) counter each time a reference signal received power (RSRP) measurement of the subset of beam failure detection reference signal(s) fails to exceed an RSRP threshold; and
    reset the BFI counter in response to determining that the BFI counter is less than a failure threshold upon expiration of the measurement period.

6. The UE of claim 5, wherein the UE monitors all of the beam failure detection reference signal(s) that occur during the measurement period.

7. The UE of claim 5, wherein the beam failure detection reference signal(s) include channel state information reference signals (CSI-RSs).

8. The UE of claim 5, wherein the beam failure detection reference signal(s) include synchronization signals.

9. A method comprising:
    determining, by a user equipment (UE) a duration of a measurement period in accordance with a maximum of a shortest period of beam failure detection reference signal(s) and a specified time value, wherein the duration of the measurement period is an integer multiple of the shortest period of beam failure detection reference signal(s)when the shortest period of beam failure detection reference signal(s) exceeds the specified time value;
    monitoring, by the UE, at least a subset of the beam failure detection reference signal(s) during the measurement period;
    incrementing a beam failure indication (BFI) counter each time a reference signal received power (RSRP) measurement of the subset of beam failure detection reference signal(s) fails to exceed an RSRP threshold; and
    transmitting, by the UE, a request to trigger a beam failure recovery procedure to a base station in response to determining that the BFI counter exceeds a failure threshold prior to expiration of the measurement period.

10. The method of claim 9, wherein the UE monitors all of the beam failure detection reference signal(s) that occur during the measurement period.

11. The method of claim 9, wherein the beam failure detection reference signal(s) include channel state information reference signals (CSI-RSs).

12. The method of claim 9, wherein the beam failure detection reference signal(s) include synchronization signals.

13. A user equipment (UE) comprising:
    a processor; and
    a non-transitory computer readable storage medium storing programming for execution by the processor, the programming including instructions to:
    determine a duration of a measurement period in accordance with a maximum of a shortest period of beam failure detection reference signal(s) and a specified time value, wherein the duration of the measurement period is an integer multiple of the shortest period of beam failure detection reference signal(s) when the shortest period of beam failure detection reference signal(s) exceeds the specified time value;
    monitor at least a subset of the beam failure detection reference signal(s) during the measurement period;

incrementing a beam failure indication (BFI) counter each time a reference signal received power (RSRP) measurement of the subset of beam failure detection reference signal(s) fails to exceed an RSRP threshold; and transmit a request to trigger a beam failure recovery procedure to a base station in response to determining that the BFI counter exceeds a failure threshold prior to expiration of the measurement period.

14. The UE of claim 13, wherein the UE monitors all of the beam failure detection reference signal(s) that occur during the measurement period.

15. The UE of claim 13, wherein the beam failure detection reference signal(s) include channel state information reference signals (CSI-RSs).

16. The UE of claim 13, wherein the beam failure detection reference signal(s) include synchronization signals.

17. The UE of claim 13, wherein the duration of the measurement period is an integer multiple of the specified time value when the specified time value exceeds the shortest period of beam failure detection reference signal(s).

18. The UE of claim 13, wherein the beam failure detection reference signal(s) are quasi-co-located (QCL) with demodulation reference signals (DMRSs) of a physical downlink control channel (PDCCH) monitored by the UE.

19. The method of claim 1, wherein the duration of the measurement period is an integer multiple of the specified time value when the specified time value exceeds the shortest period of beam failure detection reference signal(s).

20. The method of claim 1, wherein the beam failure detection reference signal(s) are quasi-co-located (QCL) with demodulation reference signals (DMRSs) of a physical downlink control channel (PDCCH) monitored by the UE.

21. The UE of claim 5, wherein the duration of the measurement period is an integer multiple of the specified time value when the specified time value exceeds the shortest period of beam failure detection reference signal(s).

22. The UE of claim 5, wherein the beam failure detection reference signal(s) are quasi-co-located (QCL) with demodulation reference signals (DMRSs) of a physical downlink control channel (PDCCH) monitored by the UE.

23. The method of claim 9, wherein the duration of the measurement period is an integer multiple of the specified time value when the specified time value exceeds the shortest period of beam failure detection reference signal(s).

24. The method of claim 9, wherein the beam failure detection reference signal(s) are quasi-co-located (QCL) with demodulation reference signals (DMRSs) of a physical downlink control channel (PDCCH) monitored by the UE.

* * * * *